(12) United States Patent
Pritchard et al.

(10) Patent No.: US 11,665,248 B2
(45) Date of Patent: *May 30, 2023

(54) GRAPHICAL USER INTERFACE AND SYSTEM FOR VIEWING LANDING PAGE CONTENT

(71) Applicant: Black Crow AI, Inc., New York, NY (US)

(72) Inventors: Adam R. Pritchard, New York, NY (US); Ronak M. Daya, New York, NY (US); Jean Seok, Jersey City, NJ (US); Yoaquim J. Cintron-Rosario, New York, NY (US); Mark J. Napier, Sunnyside, NY (US); Isaac W. Woodruff, Brooklyn, NY (US); Jessica Sachs, Harrison, NJ (US); Anand Safi, Jersey City, NJ (US); Jason A. Reid, Brooklyn, NY (US)

(73) Assignee: Black Crow AI, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,547

(22) Filed: Aug. 21, 2020

(65) Prior Publication Data

US 2021/0211513 A1    Jul. 8, 2021

Related U.S. Application Data

(63) Continuation of application No. 15/283,432, filed on Oct. 2, 2016, now abandoned.

(Continued)

(51) Int. Cl.
G06Q 30/02    (2023.01)
G06F 3/0481   (2022.01)
(Continued)

(52) U.S. Cl.
CPC ............ *H04L 67/53* (2022.05); *G06F 3/0481* (2013.01); *G06F 3/0484* (2013.01);
(Continued)

(58) Field of Classification Search
CPC ................ G06F 17/3089; G06F 3/048; G06Q 30/0255–0256
See application file for complete search history.

(56) References Cited

U.S. PATENT DOCUMENTS 5,323,314 A *   6/1994  Baber ................ G06Q 10/1095
                                                    345/163
6,034,683 A *   3/2000  Mansour ................ G06Q 10/06
                                                    715/764

(Continued)

FOREIGN PATENT DOCUMENTS

WO    WO 2019/052869 A1    3/2019

OTHER PUBLICATIONS

International Search Report and Written Opinion for corresponding International Application No. PCT/US2010/037427 dated Jul. 28, 2010.

(Continued)

*Primary Examiner* — Ryan F Pitaro
(74) *Attorney, Agent, or Firm* — Wolf, Greenfield & Sacks, P.C.

(57) ABSTRACT

A web site publisher may improve user interaction with landing pages from third-party publishers by displaying landing page content in a navigation window offering users the ability to interact with one or more landing pages in formats including: carousel, multiple panes, stacks, tabs, and tiles. Pages may be displayed in focus, below or behind the active display area, in full size windows, in reduced windows, and so forth. Landing page content may be loaded in advance of a user focusing on a specific page. The naviga- (Continued)

tion window offers users the ability to store preferences, to refresh landing pages, to save searches, to search in one landing page, and/or to have results propagate to other landing pages.

20 Claims, 13 Drawing Sheets

Related U.S. Application Data

(60) Provisional application No. 62/362,413, filed on Jul. 14, 2016, provisional application No. 62/362,428, filed on Jul. 14, 2016.

(51) Int. Cl.
| | |
|---|---|
| *H04L 67/53* | (2022.01) |
| *H04L 67/02* | (2022.01) |
| *G06F 16/957* | (2019.01) |
| *G06F 40/106* | (2020.01) |
| *G06F 40/143* | (2020.01) |
| *H04L 67/01* | (2022.01) |
| *H04L 67/567* | (2022.01) |
| *G06F 3/0484* | (2022.01) |
| *G06Q 30/0241* | (2023.01) |

(52) U.S. Cl.
CPC ........ *G06F 16/9577* (2019.01); *G06F 40/106* (2020.01); *G06F 40/143* (2020.01); *G06Q 30/0277* (2013.01); *H04L 67/01* (2022.05); *H04L 67/02* (2013.01); *H04L 67/567* (2022.05); *G06F 2203/04803* (2013.01)

(56) References Cited

U.S. PATENT DOCUMENTS

| | | | |
|---|---|---|---|
| 6,236,396 B1* | 5/2001 | Jenson | G06F 3/0488 |
| | | | 345/179 |
| 6,412,012 B1 | 6/2002 | Bieganski et al. | |
| 6,711,474 B1 | 3/2004 | Treyz et al. | |
| 7,130,808 B1 | 10/2006 | Ranka et al. | |
| 7,720,720 B1 | 5/2010 | Sharma et al. | |
| 7,806,329 B2 | 10/2010 | Dmitriev et al. | |
| 7,945,683 B1* | 5/2011 | Ambrose | G06F 16/9574 |
| | | | 709/228 |
| 8,126,881 B1 | 2/2012 | Sethi et al. | |
| 8,249,918 B1 | 8/2012 | Biere et al. | |
| 8,527,341 B2 | 9/2013 | Feuerstein et al. | |
| 8,527,342 B2 | 9/2013 | Feuerstein et al. | |
| 8,682,736 B2 | 3/2014 | Flake et al. | |
| 9,390,181 B1* | 7/2016 | Kotas | G06Q 30/0269 |
| 9,633,378 B1* | 4/2017 | Nath | G06Q 30/0276 |
| 9,746,997 B2* | 8/2017 | Joshi | G06Q 10/1093 |
| 9,836,784 B2 | 12/2017 | Feuerstein et al. | |
| 9,916,538 B2* | 3/2018 | Zadeh | G06K 9/627 |
| 10,175,995 B1* | 1/2019 | Mitra | G06F 9/4418 |
| 10,181,153 B2 | 1/2019 | Feuerstein et al. | |
| 10,534,851 B1* | 1/2020 | Chan | G06Q 30/0255 |
| 11,176,604 B2 | 11/2021 | Feuerstein et al. | |
| 11,176,605 B2 | 11/2021 | Feuerstein et al. | |
| 2002/0062245 A1 | 5/2002 | Niu et al. | |
| 2002/0126155 A1 | 9/2002 | Lin-Hendel | |
| 2003/0055816 A1 | 3/2003 | Paine et al. | |
| 2005/0166233 A1 | 7/2005 | Beyda et al. | |
| 2005/0222971 A1* | 10/2005 | Cary | G06Q 10/109 |
| 2005/0256766 A1 | 11/2005 | Garcia et al. | |
| 2006/0028917 A1* | 2/2006 | Wigginton | G04G 15/006 |
| | | | 368/28 |
| 2006/0064411 A1 | 3/2006 | Gross et al. | |
| 2006/0122872 A1* | 6/2006 | Stevens | G06Q 10/02 |
| | | | 705/5 |
| 2006/0206508 A1 | 9/2006 | Colace et al. | |
| 2006/0212350 A1 | 9/2006 | Ellis et al. | |
| 2007/0083429 A1 | 4/2007 | Kraft | |
| 2007/0101381 A1* | 5/2007 | Furlong | H04N 21/44218 |
| | | | 725/105 |
| 2007/0157245 A1 | 7/2007 | Collins | |
| 2007/0239517 A1 | 10/2007 | Chung et al. | |
| 2007/0244750 A1 | 10/2007 | Grannan et al. | |
| 2008/0034314 A1 | 2/2008 | Louch et al. | |
| 2008/0082925 A1* | 4/2008 | Brush | G06Q 10/1093 |
| | | | 715/744 |
| 2008/0177609 A1* | 7/2008 | Grieb | G06Q 10/109 |
| | | | 705/7.18 |
| 2008/0201220 A1 | 8/2008 | Broder et al. | |
| 2008/0270154 A1 | 10/2008 | Klots et al. | |
| 2008/0270164 A1 | 10/2008 | Kidder et al. | |
| 2008/0281809 A1 | 11/2008 | Anderson et al. | |
| 2008/0288325 A1 | 11/2008 | Pavlov | |
| 2009/0282343 A1* | 11/2009 | Catlin | G06F 16/9535 |
| | | | 715/738 |
| 2009/0287701 A1* | 11/2009 | Breaker | G06Q 50/30 |
| 2010/0057560 A1 | 3/2010 | Skudlark et al. | |
| 2010/0076895 A1 | 3/2010 | Spencer et al. | |
| 2010/0138291 A1 | 6/2010 | Silverman et al. | |
| 2010/0159967 A1* | 6/2010 | Pounds | H04L 67/325 |
| | | | 455/466 |
| 2010/0161605 A1* | 6/2010 | Gabrilovich | G06Q 30/02 |
| | | | 707/736 |
| 2010/0223096 A1 | 9/2010 | Bosan et al. | |
| 2010/0251128 A1 | 9/2010 | Cordasco | |
| 2011/0054997 A1 | 3/2011 | Feuerstein et al. | |
| 2011/0054998 A1 | 3/2011 | Feuerstein et al. | |
| 2011/0055008 A1 | 3/2011 | Feuerstein et al. | |
| 2011/0125577 A1* | 5/2011 | Song | G06Q 30/0255 |
| | | | 705/14.53 |
| 2011/0167369 A1* | 7/2011 | van Os | G06F 3/0482 |
| | | | 715/769 |
| 2011/0191315 A1 | 8/2011 | Neumeyer et al. | |
| 2011/0252351 A1* | 10/2011 | Sikora | G06Q 10/109 |
| | | | 715/769 |
| 2011/0276396 A1 | 11/2011 | Rathod | |
| 2011/0288928 A1 | 11/2011 | Patwa et al. | |
| 2011/0307341 A1* | 12/2011 | Zohar | G06F 16/958 |
| | | | 705/14.73 |
| 2012/0084354 A1* | 4/2012 | Shinomoto | G06F 3/1462 |
| | | | 709/203 |
| 2012/0166540 A1* | 6/2012 | Reis | G06Q 30/0201 |
| | | | 705/14.66 |
| 2013/0073400 A1* | 3/2013 | Heath | G06Q 50/01 |
| | | | 715/738 |
| 2013/0125047 A1* | 5/2013 | Levin | G06F 3/0488 |
| | | | 715/790 |
| 2013/0132854 A1* | 5/2013 | Raleigh | H04W 4/60 |
| | | | 715/738 |
| 2013/0144720 A1 | 6/2013 | Hari et al. | |
| 2013/0325832 A1 | 12/2013 | French et al. | |
| 2014/0297739 A1 | 10/2014 | Stein et al. | |
| 2015/0095145 A1 | 4/2015 | Shulman et al. | |
| 2015/0127403 A1* | 5/2015 | Petty | G06F 3/04842 |
| | | | 705/7.18 |
| 2015/0163256 A1* | 6/2015 | Frank | H04W 4/21 |
| | | | 715/753 |
| 2015/0242495 A1 | 8/2015 | Goldstein et al. | |
| 2016/0057383 A1 | 2/2016 | Pattan et al. | |
| 2016/0180389 A1* | 6/2016 | Kotas | G06F 16/958 |
| | | | 705/14.54 |
| 2017/0017369 A1 | 1/2017 | Kanter et al. | |
| 2017/0078922 A1* | 3/2017 | Raleigh | H04W 28/10 |
| 2017/0201850 A1* | 7/2017 | Raleigh | G06F 3/0482 |
| 2017/0293419 A1 | 10/2017 | Dipin | |
| 2017/0329851 A1* | 11/2017 | Yan | G06F 16/957 |
| 2017/0347164 A1* | 11/2017 | Thomas | H04N 21/4532 |
| 2017/0372413 A1 | 12/2017 | Feuerstein et al. | |
| 2018/0018063 A1 | 1/2018 | Pritchard et al. | |
| 2018/0018304 A1 | 1/2018 | Pritchard et al. | |
| 2019/0197611 A1 | 6/2019 | Feuerstein et al. | |
| 2019/0213669 A1 | 7/2019 | Feuerstein et al. | |
| 2019/0213670 A1 | 7/2019 | Feuerstein et al. | |
| 2021/0211512 A1 | 7/2021 | Pritchard et al. | |

(56) References Cited

U.S. PATENT DOCUMENTS

OTHER PUBLICATIONS

International Preliminary Report on Patentability for corresponding International Application No. PCT/US2010/037427 dated Dec. 15, 2011.
Canadian Examiner's Report for corresponding Canadian Application No. 2,764,493 dated Feb. 22, 2016.
European Examiner's Report for corresponding European Application No. 10784162.9 dated Aug. 31, 2016.
Extended European Search Report for corresponding European Application No. 10784162.9 dated Jun. 30, 2014.
Canadian Examiner's Report for corresponding Canadian Application No. 2,764,493 dated Jan. 11, 2017.
International Search Report and Written Opinion dated Sep. 22, 2017 for corresponding International Application No. PPCT/US027/041915.
International Preliminary Report on Patentability for corresponding International Application No. PCT/US2017/041915 dated Jan. 24, 2019.
Extended European Search Report dated Oct. 9, 2019 in connection with European Application No. 19153562.4.
[No Author Listed], System, Method and Computer Program Product for Presenting an Option to Receive advertisement Content. The IP.com Prior Art Database. Nov. 29, 2006. 13 pages.
Olans et al., Federal Regulation of False Advertising. 5 B.C. Indus & Com L. Rev 704 (1964). p. 704-738.

\* cited by examiner

GRAPHICAL USER INTERFACE AND SYSTEM FOR VIEWING LANDING PAGE CONTENT

RELATED APPLICATIONS

This Application is a Continuation of U.S. application Ser. No. 15/283,432, filed Oct. 2, 2016, entitled "GRAPHICAL USER INTERFACE AND SYSTEM FOR VIEWING LANDING PAGE CONTENT", which is a Non-Provisional of Provisional (35 USC 119(e)) of U.S. Application Ser. No. 62/362,413, filed Jul. 14, 2016, entitled "GRAPHICAL USER INTERFACE AND SYSTEM FOR VIEWING LANDING PAGE CONTENT". Application Ser. No. 15/283,432 is a Non-Provisional of Provisional (35 USC 119(e)) of U.S. Application Ser. No. 62/362,428, filed Jul. 14, 2016, entitled "GRAPHICAL USER INTERFACE AND SYSTEM FOR VIEWING LANDING PAGE CONTENT". The entire contents of these applications are incorporated herein by reference in their entirety.

BACKGROUND OF INVENTION

1. Field of Invention

The present disclosure relates generally to Internet technologies, specifically content distribution.

2. Discussion of Related Art

Internet publishers distribute a variety of content according to business models that range from free, public access to subscription services. Often, in return for displaying free content, Internet publishers will display advertising to web site visitors. Third-party publishers commonly pay publishers for the opportunity to display advertising content to drive user traffic to third-party publisher websites. One approach used to display Internet advertising includes the use of landing page content. Conventional approaches to providing landing page content have included linking, such as with a text or image-based display advertisement, to a landing page. The landing page may be hosted on a publisher's website, an intermediary website, a mobile application, or a third-party publisher's application or website. If a landing page is displayed, it may appear in a separate web browser window, as a new tab in an open web browser window, or as a window in a software application.

SUMMARY OF INVENTION

The inventors have recognized that a limitation of Internet content distribution includes the realization once a landing page is displayed to a user, the user may navigate away from the site that originally displayed the link to the landing page. Generally, the publisher of this first web site retains little control over the user experience on the landing page associated with a second web site. Also, while the conventional model may lead to the display of multiple landing pages, only one landing page may appear at a time. Furthermore, web browser interfaces and tools (e.g., mouse, cursor, and keystrokes) may limit users and their ability to navigate from one landing page to another.

Historically, Internet content publishers, including publishers of media, commerce, gaming, and other types of sites, have sought to retain user attention and to discourage users from visiting sites hosted by competing publishers. For example, the New York Times has not historically encouraged site visitors to click through to content hosted by the Washington Post. This has led to an arm's length relationship between publishers in similar categories, and as a result, content targeting networks have emerged to enable publishers in a category to compete for user attention when those users are visiting other websites. Following the above example, suppose a newspaper has published a series of articles on an upcoming presidential election—in traditional content targeting, the newspaper could bid to display an advertisement to attract the attention of a user engaging in any of the following behaviors: searching for information about presidential candidates on a search engine, visiting a political party website, posting comments to a website, and even while visiting the newspaper's own website. In content retargeting, a site publisher relies on networks to deliver advertising and other forms of content to site visitors who subsequently visit other sites.

Historically, targeted and retargeted network content delivery has been limited to hyperlinked text, Flash animations, and other types of images (e.g. GIF, JPEG, TIF). Also, the targeting and retargeting model has traditionally been focused on retaining users and site visitors. When delivering users and site visitors to landing page content, two models exist: "click-in" and "click-out." A "click-in" landing page is interactive content that links the user to a landing page within the publisher's website, for example, where a third-party publisher pays for placing an ad on the publisher's website. Meanwhile, a "click-out" landing page is a landing page link that links the user to a landing page specified by a third-party publisher (e.g., a web page on an third-party publisher's website). In low conversion environments, such as where users comparison shop between multiple sites, publishers face challenges in adapting to changing landing page content (e.g. product, pricing, and inventory searches) while preserving a "click-in" experience for the user.

Improved methods and systems for Internet content distribution are described herein. According to one aspect the inventors have appreciated that on a typical e-commerce website operated by a publisher, where certain goods and/or services are sold, a vast majority of visitors to the first website do not complete a sales transaction, which is referred to in the art as a "conversion." In fact, it is realized that a typical e-commerce website has a conversion rate of 3%-5%. Thus, it is appreciated that visitors primarily use some e-commerce websites to browse and research products. For instance, visitors may research product features, price, availability, reviews, and comparison information on many such websites without making any purchases. Often, after acquiring the desired information about a particular product from the website, the user will locate and purchase that product from another source, for example on another website operated by a different publisher or complete the transaction using another channel (e.g., telephone order, brick-and-mortar store).

In one example, the user may find that the e-commerce website provides a convenient place to research and/or comparison shop, but once a purchasing decision is made, the user exercises his or her preference for purchasing certain products directly from a manufacturer or a trusted retailer rather than from the publisher. Specifically, a user accesses an online travel service, such as Expedia® online travel website available from Expedia, Inc., to shop for airline tickets, but after locating the desired itinerary and fare, the user ultimately purchases the tickets directly from the airline and not from the Expedia website. In another example, the visitor does not find what he or she is looking for on the first website, and leaves the website without completing a transaction.

When no transaction occurs on the website, the publisher receives no transaction revenue from the visitor. According to one aspect, it is appreciated that most e-commerce websites monetize their visitors exclusively, or almost exclusively, through transaction (or sales) revenue. In some instances, a publisher receives a stream of advertising (or media) revenue for serving ads on their website for various goods and services sold by others. The media revenue, if any, is generally used to supplement the transaction revenue. Publishers may employ various approaches to determining when, and if, to display third-party publisher content to a given user. Example approaches, such as hurdle rates, are discussed in U.S. Pat. Nos. 8,527,341 and 8,527,342, both entitled "METHOD AND SYSTEM FOR ELECTRONIC ADVERTISING," both filed Jun. 4, 2010, which are both incorporated herein by reference. Also, this application is a continuation of U.S. patent application Ser. No. 12/793,920 filed Jun. 4, 2010, which is incorporated herein by reference.

The sharing of advertising revenue between various publishers of travel and e-commerce sites creates a context for the present disclosure. According to various aspects of the present disclosure, new user interfaces and associated systems are provided that improve how a website publisher displays content from third-party publishers. In one embodiment, this content may extend beyond advertising messages to include landing pages from third-party publishers. In one implementation, a user may request content from a publisher's website, and the publisher may provide interface components that open additional windows and/or tabs to display landing page content from various third-party publishers. In another implementation, the publisher may provide components used to display third-party landing page content in a separate navigation window. In yet another aspect, the initial search may originate within a mobile application, and the publisher may display third-party landing pages within the mobile application in a variety of ways.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; and displaying within a portion of at least one graphical user interface a presentation interface comprising a representation of the respective landing page content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; and displaying within a portion of at least one graphical user interface a presentation interface comprising a representation of the respective landing page content, wherein each of the respective landing page content is arranged in one or more of the formats comprising the group of: horizontal tabs, vertical tabs, carousel, multi-pane, staggered, or stacked.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; and displaying within a portion of at least one graphical user interface a presentation interface comprising a representation of the respective landing page content, wherein, each respective landing page is presented in one or more of the formats comprising the group of: landing page thumbnail, loaded landing page, landing page icon, or image representing the landing page.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; and displaying within a portion of at least one graphical user interface a presentation interface comprising a representation of the respective landing page content, wherein the at least one graphical user interface comprises a first content display area having an initial control that accepts the first content request, and the method further comprises acts of: receiving, from a user interacting with the initial control area of the first content display area, the first content request; requesting, responsive to the first content request, content from a publisher associated with the first content display area; receiving the content from the publisher associated with the first content display area; and displaying, within the first content display area, the content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; and displaying within a portion of at least one graphical user interface a presentation interface comprising a representation of the respective landing page content, wherein the at least one graphical user interface comprises a first content display area having an initial control that accepts the first content request; receiving, from a user interacting with the initial control area of the first content display area, the first content request; requesting, responsive to the first content request, content from a publisher associated with the first content display area; receiving the content from the publisher associated with the first content display area; and displaying, within the first content display area, the content, wherein the at least one graphical user interface displays the respective landing page content from each of the one or more third-party publishers in a second content display area.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; and displaying within a portion of at least one graphical user interface a presentation interface comprising a representation of the respective landing page content, wherein the at least one graphical user interface comprises a first content display area having an initial control that accepts the first content request, and the method further comprises acts of: receiving, from a user interacting with the initial control area of the first content display area, the first content request; requesting, responsive to the first content request, content from a publisher associated with the first content display area; receiving the content from the publisher associated with the first content display area; and displaying, within the first content display area, the content, wherein the first content display area is a web page.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; and displaying within a portion of at least one graphical user interface a presentation interface comprising a representation of the respective landing page content, wherein the at least one graphical user interface comprises a first content display area having an initial control that accepts the first content request; receiving, from a user interacting with the initial control area of the first content display area, the first content request; requesting, responsive to the first content request, content from a publisher associated with the first content display area; receiving the content from the publisher associated with the first content display area; and displaying, within the first content display area, the content, wherein the at least one graphical user interface displays the respective landing page content from each of the one or more third-party publishers in a second content display area, and wherein the first content display area is a web page.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; displaying within a portion of at least one graphical user interface a presentation interface comprising a representation of the respective landing page content; receiving a second content request; identifying, responsive to the second content request, one or more third-party publishers from which to request landing page content; requesting, responsive to the second content request, respective landing page content from each of the identified one or more third-party publishers; receiving the respective landing page content from each of the identified one or more third-party publishers; and displaying within a portion of at least one graphical user interface a presentation interface comprising a representation of the respective landing page content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; displaying within a portion of at least one graphical user interface a presentation interface comprising a representation of the respective landing page content, wherein the at least one graphical user interface comprises a first content display area having an initial control that accepts the first content request, and the method further comprises acts of: receiving, from a user interacting with the initial control area of the first content display area, the first content request; requesting, responsive to the first content request, content from a publisher associated with the first content display area; receiving the content from the publisher associated with the first content display area; displaying, within the first content display area, the content; receiving, from a user interacting with the initial control area of the first content display area, a second content request; requesting, responsive to the second content request, content from the publisher associated with the first content display area; receiving content from the publisher associated with the first content display area; and displaying, within the first content display area, the content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; displaying within a portion of at least one graphical user interface a presentation interface comprising a representation of the respective landing page content, wherein the at least one graphical user interface comprises a first content display area having an initial control that accepts the first content request; receiving, from a user interacting with the initial control area of the first content display area, the first content request; requesting, responsive to the first content request, content from a publisher associated with the first content display area; receiving the content from the publisher associated with the first content display area; displaying, within the first content display area, the content, wherein the at least one graphical user interface displays the respective landing page content from each of the one or more third-party publishers in a second content display area; receiving, from a user interacting with the initial control area of the first content display area, a second content request; identifying, responsive to the second content request, one or more third-party publishers from which to request landing page content; requesting, responsive to the second content request, respective landing page content from each of the identified one or more third-party publishers; receiving the respective landing page content from each of the identified one or more third-party publishers; and displaying within a portion of at least one graphical user interface a presentation interface comprising a representation of the respective landing page content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; displaying within a portion of at least one graphical user interface a presentation interface comprising a representation of the respective landing page content, wherein the at least one graphical user interface comprises a first content display area having an initial control that accepts the first content request; receiving, from a user interacting with the initial control area of the first content display area, the first content request; requesting, responsive to the first content request, content from a publisher associated with the first content display area; receiving the content from the publisher associated with the first content display area; displaying, within the first content display area, the content, wherein the at least one graphical user interface displays the respective landing page content from each of the one or more third-party publishers in a second content display area; receiving, from a user interacting with the initial control area of the first content display area, a second content request; requesting, responsive to the second content request, content from the publisher associated with the first content display area; receiving content from the publisher associated with the first content display area; displaying, within the first content display area, the content; identifying, responsive to the second content request, one or more third-party publishers from which to request landing page content; requesting, responsive to the second content request, respective landing page content from each of the identified one or more third-party publishers; receiving the respective landing page content from each of the identified one or more third-party publishers; and displaying within a portion of at least one graphical user interface a presentation interface comprising a representation of the respective landing page content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; displaying within a portion of at least one graphical user interface a presentation interface comprising a representation of the respective landing page content, wherein the at least one graphical user interface comprises a first content display area having an initial control that accepts the first content request; receiving, from a user interacting with the initial control area of the first content display area, the first content request; requesting, responsive to the first content request, content from a publisher associated with the first content display area; receiving the content from the publisher associated with the first content display area; and displaying, within the first content display area, the content, wherein the at least one graphical user interface displays the respective landing page content from each of the one or more third-party publishers in a second content display area, wherein a landing page displayed in the second content display area includes at least one initial control capable of accepting a second content request; receiving, from a user interacting with an initial control area of a landing page in the second content display area, a second content request; requesting, responsive to the second content request, landing page content from the third-party publisher associated with the landing page; receiving the landing page content from the third-party publisher; and displaying within a portion of at least one graphical user interface a presentation interface comprising a representation of the respective landing page content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; displaying within a portion of at least one graphical user interface a presentation interface comprising a representation of the respective landing page content, wherein the at least one graphical user interface comprises a first content display area having an initial control that accepts the first content request; receiving, from a user interacting with the initial control area of the first content display area, the first content request; requesting, responsive to the first content request, content from a publisher associated with the first content display area; receiving the content from the publisher associated with the first content display area; and displaying, within the first content display area, the content, wherein the at least one graphical user interface displays the respective landing page content from each of the one or more third-party publishers in a second content display area, wherein the second content display area includes at least one initial control capable of accepting a second content request; receiving, from a user interacting with the initial control area of the second content display area, a second content request; requesting, responsive to the second content request, content from the publisher associated with the first content display area; receiving content from the publisher associated with the first content display area; and displaying, within the first content display area, the content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; displaying within a portion of at least one graphical user interface a presentation interface comprising a representation of the respective landing page content, wherein the at least one graphical user interface comprises a first content display area having an initial control that accepts the first content request; receiving, from a user interacting with the initial control area of the first content display area, the first content request; requesting, responsive to the first content request, content from a publisher associated with the first content display area; receiving the content from the publisher associated with the first content display area; and displaying, within the first content display area, the content, wherein the at least one graphical user interface displays the respective landing page content from each of the one or more third-party publishers in a second content display area, wherein the second content display area includes at least one initial control capable of accepting a second content request; receiving, from a user interacting with the initial control area of the second content display area, a second content request; identifying, responsive to the second content request, one or more third-party publishers from which to request landing page content; requesting, responsive to the second content request, respective landing page content from each of the identified one or more third-party publishers; receiving the respective landing page content from each of the identified one or more third-party publishers; and displaying within a portion of at least one graphical user interface a presentation interface comprising a representation of the respective landing page content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; displaying within a portion of at least one graphical user interface a presentation interface comprising a representation of the respective landing page content, wherein the at least one graphical user interface comprises a first content display area having an initial control that accepts the first content request; receiving, from a user interacting with the initial control area of the first content display area, the first content request; requesting, responsive to the first content request, content from a publisher associated with the first content display area; receiving the content from the publisher associated with the first content display area; and displaying, within the first content display area, the content, wherein the at least one graphical user interface displays the respective landing page content from each of the one or more third-party publishers in a second content display area, wherein the second content display area includes at least one initial control capable of accepting a second content request; receiving, from a user interacting with the initial control area of the second content display area, a second content request; requesting, responsive to the second content request, content from the publisher associated with the first content display area; receiving content from the publisher associated with the first content display area; displaying, within the first content display area, the content; identifying, responsive to the second content request, one or more third-party publishers from which to request landing page content; requesting, responsive to the second content request, respective landing page content from each of the identified one or more third-party publishers; receiving the respective landing page content from each of the identified one or more third-party publishers; and displaying within a portion of at least one graphical user interface a presentation interface comprising a representation of the respective landing page content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; and displaying within a portion of at least one graphical user interface a presentation interface comprising a representation of the respective landing page content; observing user interactions in a distributed computer system; deciding, responsive to at least one of the group comprising: the first content request and the observed user interactions, to update the presentation interface; identifying, responsive to at least one of the group comprising: the first content request and the observed user interactions, one or more third-party publishers from which to request landing page content; requesting, responsive to at least one of the group comprising: the first content request and the observed user interactions, respective landing page content from each of the identified one or more third-party publishers; receiving the respective landing page content from each of the identified one or more third-party publishers; and displaying within a portion of at least one graphical user interface a presentation interface comprising a representation of the respective landing page content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; and displaying within a portion of at least one graphical user interface a presentation interface comprising a representation of the respective landing page content; storing the first content request as a stored content request; terminating a session of the presentation interface displayed within the at least one graphical user interface; deciding to initiate a new session of the presentation interface; identifying, responsive to the stored content request, one or more third-party publishers from which to request landing page content; requesting, responsive to at least one of the group comprising: the first content request and the observed user interactions, respective landing page content from each of the identified one or more third-party publishers; receiving the respective landing page content from each of the identified one or more third-party publishers; and displaying within a portion of at least one graphical user interface a presentation interface comprising a representation of the respective landing page content.

According to an embodiment of the disclosure, a method for displaying third-party landing page content includes receiving a first content request; identifying, responsive to the first content request, one or more third-party publishers from which to request landing page content; requesting, responsive to the first content request, respective landing page content from each of the identified one or more third-party publishers; receiving the respective landing page content from each of the identified one or more third-party publishers; and displaying within a portion of at least one graphical user interface a presentation interface comprising a representation of the respective landing page content; observing user interactions in a distributed computer system; storing the first content request as a stored content request; deciding, responsive to at least one of the group comprising: the stored content request and the observed user interactions, to update the presentation interface; identifying, responsive to at least one of the group comprising: the stored content request and the observed user interactions, one or more third-party publishers from which to request landing page content; requesting, responsive to at least one of the group comprising: the stored content request and the observed user interactions, respective landing page content from each of the identified one or more third-party publishers; receiving the respective landing page content from each of the identified one or more third-party publishers; and displaying within a portion of at least one graphical user interface a presentation interface comprising a representation of the respective landing page content.

According to an embodiment of the disclosure, a distributed computer system comprising a client component configured to accept a first content request; transmit the first content request to a publishing platform; receive landing page content responsive to the first content request; and display within a portion of at least one graphical user interface a presentation interface comprising a representation of the received landing page content.

According to an embodiment of the disclosure, a distributed computer system comprises a client component configured to accept a first content request; transmit the first content request to a publishing platform; receive landing page content responsive to the first content request; and display within a portion of at least one graphical user interface a presentation interface comprising a representation of the received landing page content, wherein the landing page content is arranged in one or more of the formats comprising the group of: horizontal tabs, vertical tabs, carousel, multi-pane, staggered, or stacked.

According to an embodiment of the disclosure, a distributed computer system comprises a client component configured to accept a first content request; transmit the first content request to a publishing platform; receive landing page content responsive to the first content request; and display within a portion of at least one graphical user interface a presentation interface comprising a representation of the received landing page content, wherein the landing page content is arranged in one or more of the formats comprising the group of: landing page thumbnail, loaded landing page, landing page icon, or image representing the landing page.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content, wherein the at least one graphical user interface comprises a first content display area having an initial control that accepts the first content request; accept, from a user interacting with the initial control area of the first content display area, the first content request; transmit the first content request to a publisher associated with the first content display area; receive the content from the publisher associated with the first content display area; and display, within the first content display area, the content.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content, wherein the at least one graphical user interface comprises a first content display area having an initial control that accepts the first content request and a second content display area; accept, from a user interacting with the initial control area of the first content display area, the first content request; transmit the first content request to a publisher associated with the first content display area; receive the content from the publisher associated with the first content display area; display, within the first content display area, the content; and display, within the second content display area, the landing page content.

According to an embodiment of the disclosure, a distributed computer system comprises a client component configured to accept a first content request; transmit the first content request to a publishing platform; receive landing page content responsive to the first content request; and display within a portion of at least one graphical user interface a presentation interface comprising a representation of the received landing page content, wherein the first content display area is a web page.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content, wherein the at least one graphical user interface comprises a first content display area having an initial control that accepts the first content request; accept, from a user interacting with the initial control area of the first content display area, the first content request; transmit the first content request to a publisher associated with the first content display area; receive the content from the publisher associated with the first content display area; and display, within the first content display area, the content, wherein the first content display area is a web page.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content; accept, from a user interacting with the initial control area of the first content display area, a second content request; transmit the second content request to a publishing platform; receive landing page content responsive to the second content request; and display within a portion of at least one graphical user interface a presentation interface comprising a representation of the received landing page content.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content, wherein the at least one graphical user interface comprises a first content display area having an initial control that accepts the first content request; accept, from a user interacting with the initial control area of the first content display area, the first content request; transmit the first content request to a publisher associated with the first content display area; receive the content from the publisher associated with the first content display area; display, within the first content display area, the content; accept, from a user interacting with the initial control area of the first content display area, a second content request; transmit the second content request to a publishing platform; receive content from the publisher associated with the first content display area; and display, within the first content display area, the content.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content, wherein the at least one graphical user interface comprises a first content display area having an initial control that accepts the first content request and a second content display area; accept, from a user interacting with the initial control area of the first content display area, the first content request; transmit the first content request to a publisher associated with the first content display area; receive the content from the publisher associated with the first content display area; display, within the first content display area, the content; display, within the second content display area, the landing page content; accept, from a user interacting with the initial control area of the first content display area, a second content request; transmit the second content request to a publishing platform; receive landing page content responsive to the second content request; and display, within the second display area, the landing page content.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content, wherein the at least one graphical user interface comprises a first content display area having an initial control that accepts the first content request and a second content display area; accept, from a user interacting with the initial control area of the first content display area, the first content request; transmit the first content request to a publisher associated with the first content display area; receive the content from the publisher associated with the first content display area; display, within the first content display area, the content; display, within the second content display area, the landing page content; accept, from a user interacting with the initial control area of the first content display area, a second content request; transmit the second content request to a publishing platform; receive content from the publisher associated with the first content display area; display, within the first content display area, the content; receive landing page content responsive to the second content request; and display, within the second display area, the landing page content.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content, wherein the at least one graphical user interface comprises a first content display area having an initial control that accepts the first content request and a second content display area; accept, from a user interacting with the initial control area of the first content display area, the first content request; transmit the first content request to a publisher associated with the first content display area; receive the content from the publisher associated with the first content display area; display, within the first content display area, the content; display, within the second content display area, the landing page content; accept, from a user interacting with the initial control area of the first content display area, a second content request; transmit the second content request to a publishing platform; receive content from the publisher associated with the first content display area; display, within the first content display area, the content; receive landing page content responsive to the second content request; and display, within the second display area, the landing page content.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content, wherein the at least one graphical user interface comprises a first content display area having an initial control that accepts the first content request and a second content display area; accept, from a user interacting with the initial control area of the first content display area, the first content request; transmit the first content request to a publisher associated with the first content display area; receive the content from the publisher associated with the first content display area; display, within the first content display area, the content; display, within the second content display area, the landing page content; accept, from a user interacting with an initial control area of a landing page in the second content display area, a second content request; transmit the second content request to a publishing platform; receive content from the publisher associated with the first content display area; and display, within the first content display area, the content.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content, wherein the at least one graphical user interface comprises a first content display area having an initial control that accepts the first content request and a second content display area; accept, from a user interacting with the initial control area of the first content display area, the first content request; transmit the first content request to a publisher associated with the first content display area; receive the content from the publisher associated with the first content display area; display, within the first content display area, the content; display, within the second content display area, the landing page content; accept, from a user interacting with an initial control area of a landing page in the second content display area, a second content request; transmit the second content request to a publishing platform; receive landing page content responsive to the second content request; and display, within the second display area, the landing page content.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content, wherein the at least one graphical user interface comprises a first content display area having an initial control that accepts the first content request and a second content display area; accept, from a user interacting with the initial control area of the first content display area, the first content request; transmit the first content request to a publisher associated with the first content display area; receive the content from the publisher associated with the first content display area; display, within the first content display area, the content; display, within the second content display area, the landing page content; accept, from a user interacting with an initial control area of a landing page in the second content display area, a second content request; transmit the second content request to a publishing platform; receive content from the publisher associated with the first content display area; display, within the first content display area, the content; receive landing page content responsive to the second content request; and display, within the second display area, the landing page content.

According to an embodiment of the disclosure, a distributed computer system comprises a client component configured to accept a first content request; transmit the first content request to a publishing platform; receive landing page content responsive to the first content request; display within a portion of at least one graphical user interface a presentation interface comprising a representation of the received landing page content; and observe user interactions in a distributed computer system.

BRIEF DESCRIPTION OF DRAWINGS

The accompanying drawings are not drawn to scale. In the drawings, each identical or nearly identical component that is illustrated in various figures is represented by a like numeral. For purposes of clarity, not every component may be labeled in every drawing. In the drawings.

DETAILED DESCRIPTION OF INVENTION

Figure 1A:
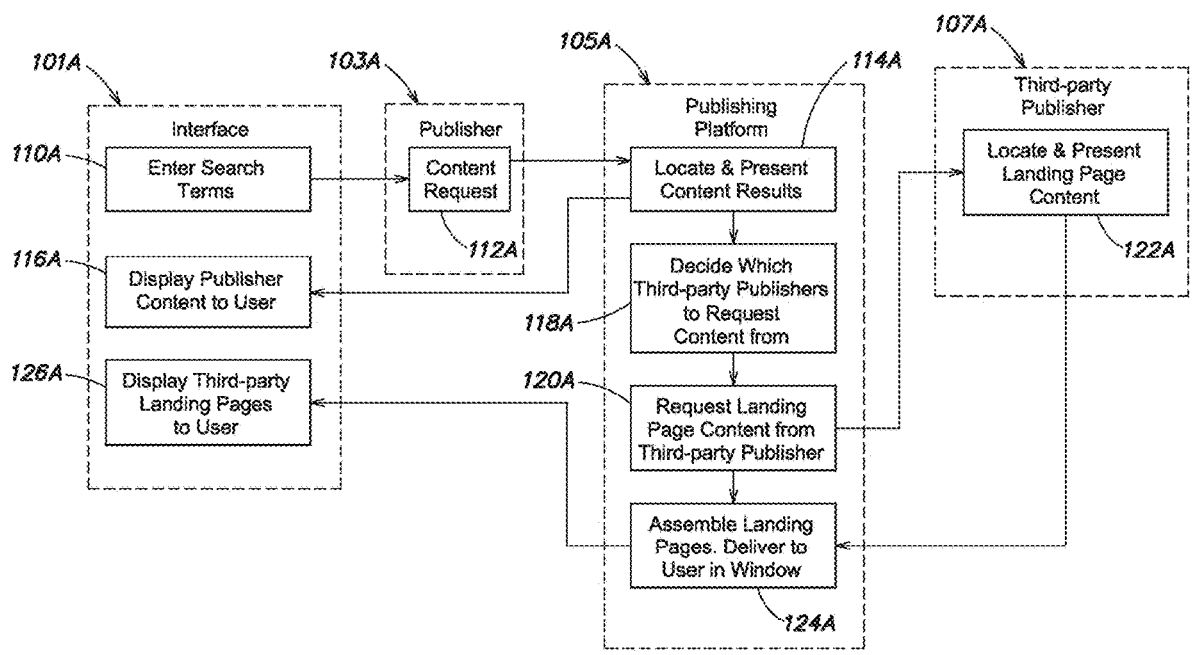
FIG. 1A is a schematic diagram of an exemplary system in accordance with one embodiment of the present disclosure.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

As discussed herein, a "content request" may include user-driven searches for content (e.g. by a user interacting with a search box, controls, sliders, buttons, and other tools within a user interface), user actions (e.g. clicking on links, tags, and other interactive material), saved search for content from prior sessions, a prior search refreshed after a specified time, searches driven by applications and rules (e.g. behavioral, contextual, or other targeting software), searches driven by predictions or predictive software algorithms, or any other command or action by a person or a machine intended to retrieve content from an interactive site. In some embodiments, a content request may take the form of a Hypertext Transfer Protocol (HTTP) or secure Hypertext Transfer Protocol (HTTPS) request to a web server.

As discussed herein, a "landing page presentation interface" displays representations of one or more landing pages from various websites. The landing pages may be requested with custom Uniform Resource Locator (URL) information communicated over HTTP that passes a content request to a website publishing platform. The landing page may be presented in a variety of manners, including but not limited to: as a web page employing Hypertext Markup Language (HTML), as a display rendered in a user interface, and as an application on a mobile computing device.

As discussed herein, a "publisher" may publish a website (e.g. a travel or e-commerce website), a mobile application environment, or any other interactive content available over a network. The publisher may sell advertising or may employ content delivery networks (e.g. advertising networks) in order to deliver website and other interactive content to users. A publisher may offer to sell content delivery services, such as advertising. Interactive and web content may be delivered as a landing page. As it relates to the publisher of a website, the term "third-party publisher" may include other websites, other mobile applications, other gaming sites, and other interactive publishers that may barter for, trade, share, or purchase content delivery services (e.g. advertising, landing pages, and the like) from the publisher.

As discussed herein, a "website" may include any number of interactive content sites available on the Internet or other electronic network. Websites may be constructed using a variety of languages and protocols, including HTML, the JavaScript programming language, extensible markup language (XML), asynchronous JavaScript and XML (Ajax), JavaScript Object Notation (JSON), JavaScript Object Notation with padding (JSONP), and others. Users may interact with websites with a web browser or a dedicated software application (e.g. a mobile application).

As discussed herein the terms "publishing platform" and "publishing system" refer broadly to interactive online platforms for content management, decision processes, and delivery. A "publishing platform" or "publishing system" may include web servers, content servers, caching systems, advertising servers, advertising networks, content delivery networks, and so forth as operated by a variety of parties. The terms "publishing platform" and "publishing system" are not intended to be limiting or to refer to operation by a single entity, such as a publisher, and more than one entity (e.g. multiple publishers) may operate within a single "publishing platform" or "publishing system."

Landing Pages

According to an aspect, various embodiments of systems and methods disclosed herein address a variety of "landing page" models. A landing page is a web page that is displayed as the result of a content request, such as when a user selects (e.g., by "clicking on" with a pointing device such as a mouse) a content link displayed within the webpage. According to another aspect, the content request may result from an application or software running within a distributed computing system.

A "click-in" landing page includes content that links the user to a landing page within the publisher's website, for example, where a third party (e.g. a third-party publisher wishing to drive user traffic to a website) pays for placing content on the publisher's website. A publisher and/or a third-party publisher may provide the content (or creative content) of the click-in landing page. For example, if a user clicks on the linked content for flat screen TVs, the user may be presented with a new web page within the publisher's website listing flat screen TVs from a specific manufacturer for sale. In this case the manufacturer (i.e., third-party publisher) may be considered a paid sponsor of the landing page.

A "click-out" landing page includes interactive content that links the user to a landing page specified by a third-party publisher (e.g., a web page on an third-party publisher's website). For example, a user may search for "red shoes" on a shopping website and may see an ad for red shoes at Zappos.com—if the user clicks on the Zappos interactive content, he or she may be redirected to a landing page at Zappos.com responsive to the search for "red shoes."

A landing page may be "pre loaded" in that a publisher, an intermediary network, or another party may load a landing page into a display for presentation instead of a traditional text or image link. For example, instead of a text link indicating "Search for red shoes at Zappos" or an image link showing a red shoe above the Zappos logo, with both links pointing to a landing page at the Zappos site, according to one aspect of the present disclosure, a pre-loaded landing page may include an icon representing the landing page, a thumbnail image of the landing page as delivered, or a full version of the landing page presented in either the same or a separate display area. Conventionally, this type of landing page content has been displayed either in a separate tab or a popout window within a web browser.

The inventors have recognized, among other things, that a key challenge for content publishers may include presenting "click-out" landing pages in a "click-in" model. The technical challenge is for publishers to retain control over user attention in an interactive (e.g. web or Internet) computing environment as the publisher displays content, such as landing pages, from competing third-party publishers. As with traditional "click-in" approaches, the landing pages may be displayed by the publisher or by an intermediary network, such as a content delivery network or an advertising network. The "click-in" landing pages may be presented in formats that enable a publisher to offer additional features and capabilities, potentially at a premium, to third parties. A publisher may be able to charge third-party publishers more for a "click-in" landing page displayed in a custom navigation window or interface.

According to another aspect of the present disclosure, a new user interface is provided that permits more efficient user interaction with third-party provided content. For instance, the interface may provide a control that permits the user to more efficiently navigate through landing page content from multiple third-party publishers. Such content may be loaded responsive to a single action (e.g., a search on the publisher's website or an action taken by a user within the user interface). Further, the landing page content may be periodically updated based on a single user action performed in association with anyone of the landing page content sets. For instance, a user action in one landing page content window may cause the others to be updated (e.g., in the case of travel search, search parameters may be used to generate updated landing page content within each of the landing page content sets). Because less user interaction is required to update content, the interface is easier and more efficient for a user to operate.

System Overview

According to one aspect of the present invention, a system and method enables a publisher to display landing pages, from third-party publishers, in a display area. As discussed above, a problem unique to Internet publishers is that low conversion rates (e.g., in the 3%-5% range) and other user valuation metrics lead many publishers to display content from third-party publishers (e.g., links to landing pages and other forms of landing page content as discussed herein) to generate additional revenue.

According to one embodiment, the presented landing pages may include, among other things, depictions of landing pages, thumbnails, icons, and fully-loaded landing page content. According to one embodiment, the landing pages may be presented in a variety of formats, including: horizontal tabs, vertical tabs, carousel, multi-pane, staggered, stacked, and so forth as well as any combination thereof. In various embodiments, improved interfaces are provided for presenting and updating landing page content.

According to one embodiment, a user may specifically request content from a publisher. In other embodiments, the system and method may enable a publisher to display content and/or third-party landing pages without requiring a user to directly request content, such as in publishing systems employing behavioral targeting, contextual targeting, retargeting, and other approaches. In yet other embodiments, an earlier content search may be coupled with other content targeting approaches to load landing pages.

In various embodiments, landing page content may be refreshed under a variety of circumstances. For example, if a user is inactive or is visiting other sites for a period of time, a publisher may refresh the third-party landing pages to accommodate for the user's activities or to simply provide updated content, pricing information, and the like. Thus, according to various embodiments, the refreshing of third party landing pages may allow the interface to be more user-friendly and operate more efficiently requiring less user input. In some embodiments, a second content request on the publisher's site may lead to updates on the third-party landing pages. In yet other embodiments, a user may request new content on one of the third-party landing pages, and a publisher or a user may elect to update the displayed landing pages from the other third-party sites. In embodiments, with each new content request, a publisher decision engine may elect which third-party landing pages, if any, to update and display. In some further embodiments a publisher or a user may opt to close landing pages from previously-presented third-party publishers and may select different third-party publishers from which to request landing page content.

According to one embodiment, a publisher may observe or track user behavior. The tracked user behavior may include: interactions in a distributed computing environment, interactions with controls and links within a graphical user interface, alphanumeric inputs, spoken inputs, user activity and timeouts, and so forth. In a further embodiment, a user may specify the behavior of a landing page display, including the layout of the landing pages, the mode of user interaction (e.g. tabs, carousel, stacked, and so forth), timeouts, refreshes, preferred third-party publishers, and so forth.

Figure 1B:
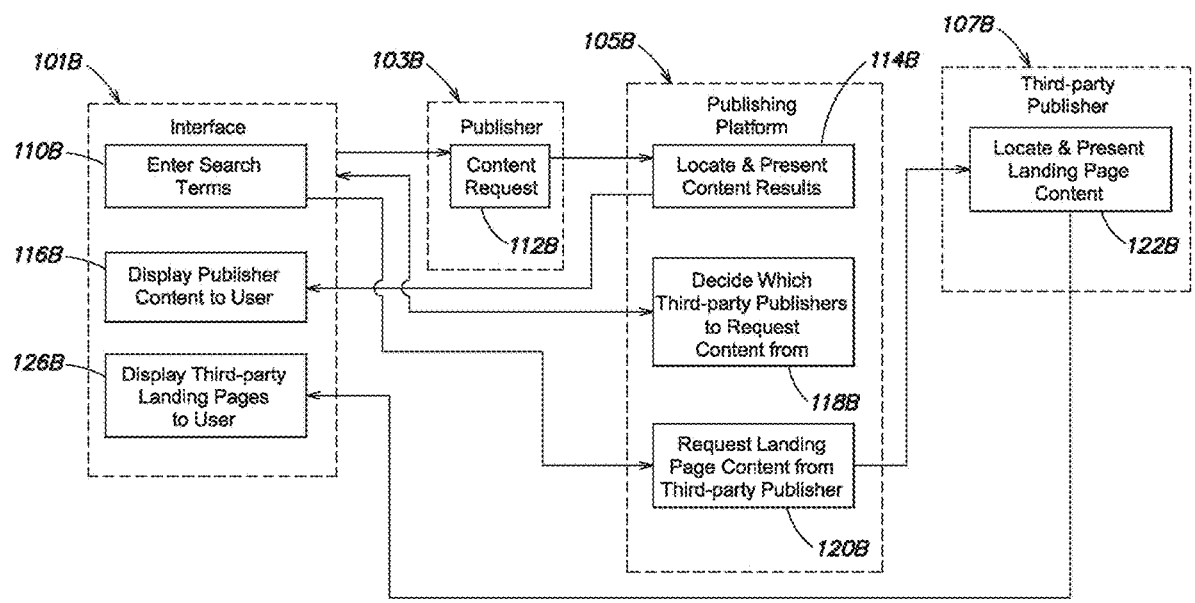
FIG. 1B is a schematic diagram of an exemplary system in accordance with one embodiment of the present disclosure.
Figure 1C:
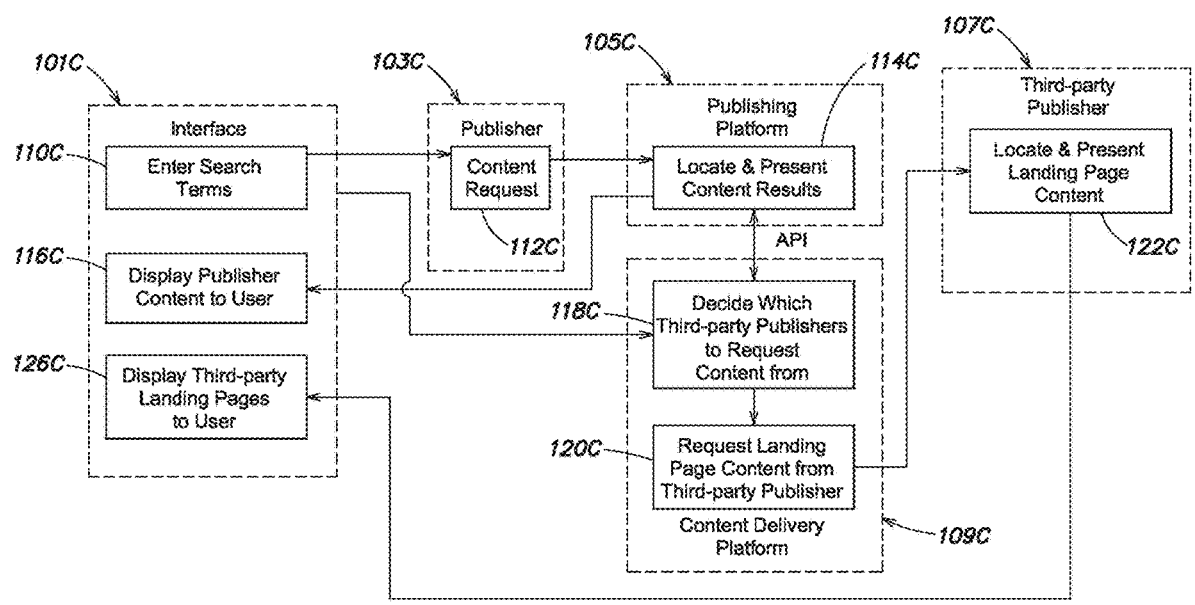
FIG. 1C is a schematic diagram of an exemplary system in accordance with one embodiment of the present disclosure.

FIGS. 1A, 1B and 1C illustrate a schematic overview of exemplary systems according to embodiments of the disclosure. Shown is an interface of a client computer 101A, 101B or 101C, such as a web browser, a publisher 103A, 103B or 103C of a travel website, a publishing platform 105A, 105B or 105C, and a third-party publisher 107A, 107B or 107C, such as another travel website. Publishing platform 105A, 105B or 105C may be a computer server or a distributed computer system on which various embodiments of the present disclosure may be implemented, including, but not limited to, presenting display areas and control interfaces to users, processing content requests, deciding which third-party publishers from which to request content, requesting third-party content, assembling landing pages from one or more third-party publishers, and presenting landing pages to a user in a display area. In some embodiments, based upon an interaction with a publishing platform 105A, 105B or 105C the interface 101A, 101B or 101C may request landing page content directly from one or more third-party publishers, open a display interface, assemble landing pages from one or more third-party publishers, and/or present the landing pages to a user in a display area.

There may be more than one interface 101A, 101B or 101C, associated with a publisher 103A-C, and one or more third-party publishers 107A-C. Publisher 103A, 103B or 103C provides one or more web pages (not shown) to a user through interface 101A, 101B or 101C. For example, the user interacts with the publisher's 103A, 103B or 103C travel website through the user interface to make a content request, such as for information about airline schedules, ticket prices, hotel room availability, or other item, by providing search terms 110A, 110B or 110C. The publisher 103A, 103B or 103C may also, or alternatively, collect other information about or from the user. This information may be used to determine potential content requests with or without the user entering search terms 110A, 110B or 110C. Such information may relate to the user's intent to purchase airline tickets on a specific day, or to a specific city, or other similar travel-related details. For example, user information may also be based on user entry onto a site a specific time, or user information may be derived from a user's prior behavior or other predictive criteria associated with a user. It should be understood that the present disclosure is not limited to travel products but may include any products sold, advertised, or distributed through electronic commerce or other electronic sites.

Requesting Content from a Publisher

According to one embodiment as shown in FIG. 1A, a user may rely on an interface 101A to interact with a publisher 103A website that may incorporate a publishing platform 105A. The website may be hosted by the publisher 103A or may be resident within the publishing platform 105A. The publishing platform addresses many of the higher-level functions associated with serving content and advertising, as well as deciding which content to display. The website may be built using a variety of technologies, including, but not limited to, HTML, JavaScript, Ajax and others. The website may comprise a variety of components hosted by numerous parties, such as web servers, ad servers, advertising networks, content delivery networks, distributed web services platforms (e.g. Amazon Web Services), and so forth. In some embodiments, the publisher 103A and the publishing platform 105A are one and the same. In other embodiments, the publisher 103A and the publishing platform 105A are distinct, may be operated by different parties, and may be in different physical locations. In yet other embodiments, the publishing platform 105A may include web hosting and cloud computing resources, and the publishing platform 105A may include a variety of content services from publishers as well as third-party publishers.

The user may request content—usually in the form of an HTTP or HTTPS request—such as by entering search terms 110A or other information. The publisher 103A sends the content request 112A to publishing platform 105A, which uses the content request 112A to find the relevant content 114A on the publishing platform. The interface 101A may also request the content directly from the publishing platform 105A.

The publishing platform 105A then displays the requested content in a web page 116A within the user interface 101A. According to one embodiment, the publisher 103A may generate a content request 112A based upon a number of criteria, including, but not limited to, user behavior and actions on the publisher's website. According to another embodiment, the user may not enter search terms 110A and the search terms may populate automatically. For example, if a user purchases an airline ticket on the publisher's website, the content request 112A may include a search for hotel rooms in the destination city on the days the user expects to travel to that city.

FIGS. 1B and 1C also demonstrate similar content requests 112B or 112C based upon entering search terms 110B or 110C in a user interface 101B or 101C such as a web browser. The publishing platform 105B or 105C locates and presents content results 114B or 114C and displays the publisher's content to the user 116B or 116C, in the interface 101B or 101C.

Requesting Content from Third-Party Publishers

Various client-based and server-based approaches exist for requesting content from third-party publishers. Therefore, according to various embodiments, various aspects of the invention may operate using different architecture. An embodiment employing a server architecture is shown in FIG. 1A; embodiments employing client-based architectures are illustrated in FIGS. 1B and 1C.

For example, in FIG. 1A, given the content request 112A, the publishing platform may determine 118A from which, if any, third-party publishers to request landing page content. This decision 118A may incorporate a variety of inputs, including but not limited to: preferences and bids from third-party publishers 107A, advertising tags, adservers, and so forth.

If the publishing platform 105A determines 118A to request third-party landing pages, the publishing platform 105A then requests content from the selected third-party publishers 120A. In order to process the content request, the publishing platform 105A may determine an appropriate Uniform Resource Locator (URL) for a given content request from a given third-party publisher 107A. The third-party publisher 107A, processes the request, locates third-party landing page content 122A, and presents the content to the publishing platform 105A, which then assembles the respective third-party landing page content 124A in a format for delivery to the user in a navigation window of the interface 101A. The publishing platform 105A may control the assembly and delivery of landing pages 124A, or this function may occur within the browser 126B, with reference to FIG. 1B to be discussed below.

FIG. 1B illustrates a schematic overview of an exemplary system according to embodiments of the disclosure. The publisher content request 112B is displayed to a user 116B based upon search terms 110B entered by a user or another party as discussed above. FIG. 1B differs from FIGS. 1A & 1C in that the interface 101B is directly involved in requesting landing page content. At some point in time, before, after, or during the content request 112B from the publisher, the interface 101B may also communicate directly with the publishing platform 105B, which may be operated by the publisher, an intermediary content delivery or advertising network, third-party publishers, or combinations of entities, to decide which third-party publishers to request landing page content from 118B.

In one embodiment, when the publisher content is displayed to the user 116B, that content may include a tag (e.g. a content delivery or an advertising tag) in the HTML and JavaScript content delivered to the interface 101B (e.g. a web browser). In other embodiments, the tag may originate in the direct communication between the interface 101B and the publishing platform 105B. The content delivery or advertising tag may then be triggered by an event (e.g. an end user action, an action by an application, and so forth) to invoke, instantiate, or open a window within the interface 101B. In some embodiments, the window may be opened within an already-open first display window. In other embodiments, the window may be opened in a second display window.

The interface 101B may then load necessary code (e.g. HTML, JavaScript, Ajax, etc.) to display in the manners discussed herein as referenced in FIGS. 5A-E, FIGS. 6A-C, and FIG. 7, below. For example, a user may perform a search in a website, and a publisher may present content in a new page within the browser window. The publisher may also display an additional navigation window for presenting landing pages from third-party publishers. The third-party landing page navigation window may include landing pages, or it may include an interface (e.g. check boxes) so that the user may request landing pages from specific third-party publishers.

The interface 101B may request landing page content, for example by using JavaScript to construct an HTTP or HTTPS request for third-party landing page content. Within the publishing platform 105B, an aspect may include a content delivery network or an advertising network that may receive the request for third-party landing page content 120B, and after performing business logic to determine which third-party publishers to request content from 118B, the content delivery or advertising network may format the request 120B for landing page content by determining appropriate URL formats for specific third-party publishers. In FIG. 1B, the publishing platform 105B may (e.g. using HTML, JSON, and JSONP) pass formatted URLs to the interface 101A which then requests the landing page content from third-party publishers 120B. FIG. 1B shows an embodiment in which the request 120B is contained within the publishing platform 105B; in other embodiments, the publishing platform 105B may include webserving capabilities for a third-party publisher; and in other embodiments, the request 120B may occur outside the publishing platform 105B and may instead be a direct communication between the interface 101B and a third-party publisher 107B.

The third-party publisher 107B may then locate and present landing page content 122B and communicate directly with the interface 101B and display third-party landing pages to the user 126B. There may be any number of third party publishers 107B.

FIG. 1C illustrates a schematic overview of an exemplary system according to embodiments of the disclosure. The functions of the publishing platform 105A as referenced in FIG. 1A, above, is split between a publishing platform 105C and a content delivery platform 109C, such as a content delivery server or an advertising server. The publishing platform 105C may communicate with the content delivery platform 109C through an application programming interface (API) in addition to HTTP, HTTPS, JavaScript, Ajax and other protocols. The user may enter search terms 110C, which are either communicated to the content delivery platform 109C directly by the interface 101C or through the API from the publishing platform 105C. At 118C, the content delivery platform 109C decides which third-party publishers to request landing page content from. At 120C, the content delivery platform 109C requests landing page content from third-party publishers 107C. The content delivery platform 109C may request the landing page content from the third-party publisher 107C by rendering the request in a custom URL format tailored to pass the search terms to the publisher in a format that the third-party publisher's 107C platform will recognize. In other embodiments, the interface 101C may, directly request landing page content 120C from third-party publisher as shown by 120B as discussed in reference to FIG. 1B above.

Once the third-party publisher 107C has located the landing page content, it may present 122C the landing page content directly to the interface 101C where the third-party landing pages are displayed 126C to the user.

Figure 2:
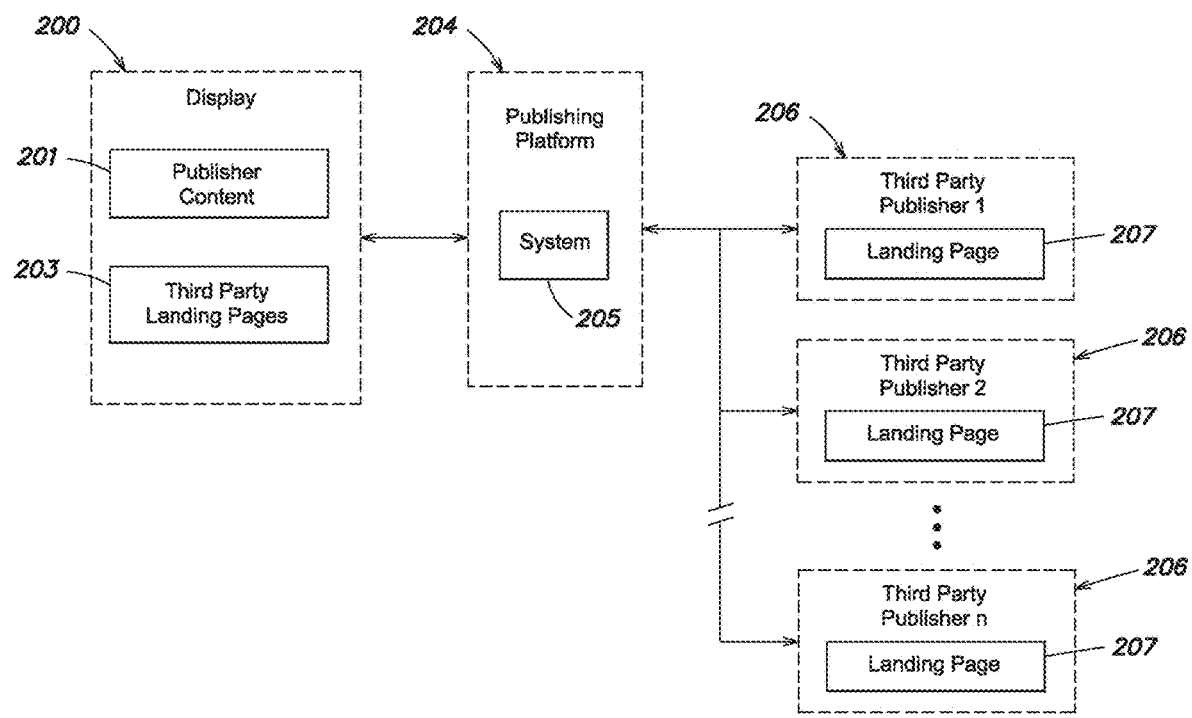
FIG. 2 is an exemplary system diagram in accordance with one embodiment of the present disclosure.

FIG. 2 illustrates various interactions of an exemplary system according to various embodiments of the disclosure. In comparison to the embodiments shown in FIG. 1, FIG. 2 further demonstrates a system including multiple third-party publishers 206 that may deliver landing page content as presented to a user by a display 200. Display 200, publishing platform 204, and third-party publisher 206 may each include, respectively, display 101A, 101B or 101C, publisher 103A, 103B or 103C publishing platform 105A, 105B or 105C, content delivery platform 109C, and third-party publisher 107A, 107B or 107C as referenced in FIGS. 1A-C, above.

As shown, the display 200 presents one or more display areas. First, display 200 provides publisher content 201, for example, one or more web pages, which may be viewed within a web browser operating on a client computer of a user (not shown). Second, display 200 also provides third-party landing pages 203, which may be viewed within a web browser operating on client computer of a user (not shown). The third-party landing pages 203 may also be viewed in another display area. Publisher content 201 and third-party landing pages 203 may be presented in a display 200 that may include interface 101A-C as referenced in FIGS. 1A-C, above.

Also, as discussed with reference to FIGS. 1A-C above, those skilled in the art will recognize that the interaction between the display 200, publishing platform 204, and third-party publishers 206 is not fixed, and the display 200 may communicate directly with a third-party publisher 206 to request and receive landing page content. In some embodiments, the request by the display 200 may be informed by an interaction with the publishing platform 204.

A publishing platform 204 includes a system 205 for delivering content in an online environment. System 205 may include, but is not limited to, an online auction for providing access to display 200 from one or more third-party publishers 206. System 205 may also include one or more components adapted to identify and serve content including landing pages 207 to display 200 to be displayed to a visitor viewing the web pages. Third-party publishers 206 provide one or more landing pages 207 to system 205 for display to a user within a device display. Also, the system 205 may include a publishing platform 105C and a content delivery platform 109C as referenced in FIG. 1C above.

In one embodiment, system 205 determines and serves, based on criteria that may include, but is not limited to: a content request, observed user behavior, or user-generated information from display 200, appropriate third-party publishers 206 from which to request respective third-party landing pages 207 to be displayed in addition to publisher content 201.

Exemplary System Architecture

Figure 3:
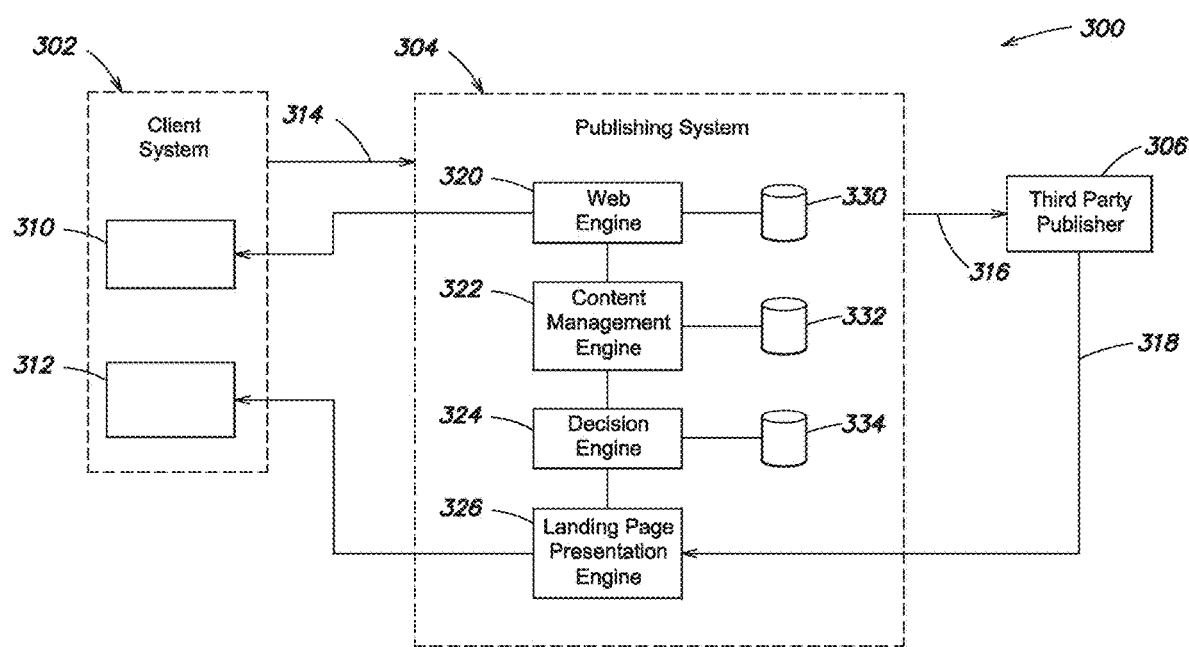
FIG. 3 is an exemplary system architecture diagram in accordance with one embodiment of the present disclosure.

FIG. 3 shows an architecture diagram of an example system 300 according to one embodiment of the invention. System 300 may, for instance, be one implementation of the system discussed above with reference to FIG. 2. It should be appreciated that FIG. 3 is used for illustration purposes only, and that other architectures may also be used to facilitate one or more aspects of the present invention.

As shown in FIG. 3, a distributed system 300 may be used to display one or more web pages and landing pages to a user within a travel site. According to one embodiment, system 300 may include one or more components that operate in cooperation with the travel site. The components may include one or more client systems 302 and a publishing system 304. For example, these components may execute on one or more computer systems associated with or interconnected to a publisher of a travel site. System 300 may include one or more processes that respond to requests from one or more client programs, such as a web browser or a mobile application. Process may include, for example, an HTTP server or other server-based process (e.g., a database server process, XML server, peer-to-peer process) that interfaces to one or more client programs distributed among one or more client systems. One or more third-party publishers 306 may interact with publishing system 304 to present landing page content to a display on a client system 302.

According to one embodiment, one or more client systems 302 may be capable of displaying web browsers and landing pages to users. The client systems 302 may include, for example, any type of operating system and/or application program capable of communicating with other computer systems through a communication network, such as the Internet. In one particular instance, the client system 302 may include a browser application program that communicates with one or more server processes using one or more communication protocols (e.g., HTTP over a TCP/IP-based network, XML requests using HTTP through an Ajax client process, distributed objects, etc.).

The client system 302 may include one or more interfaces 310 through which web pages may be presented to the user. In one example, web pages may be presented in an interface of a browser program executing on a client computer system. The client system 302 may also include a navigator interface 312 for displaying multiple landing pages from third-party publishers. In one embodiment, the navigator interface 312 may be displayed in an interface associated with a publisher web site within an interface 310 of the browser program.

According to another embodiment, the publishing system 304 receives one or more content requests 314 from a publisher through the client system 302, and one or more landing pages 318 from one or more third-party publishers 306. The publishing system 304 serves requested content to a publisher, which in turn displays the requested content to user through, for example, interface 310. The publishing system 304 also serves third-party landing pages to the publisher, which in turn displays the third-party landing pages to a user through, for example, navigator interface 312. The publishing system 304 may include the following components: a web engine 320, a content management engine 322, a decision engine 324, and a landing page presentation engine 326. The publishing system 304 also includes, a web publishing database 330, a content management database 332, and a decision database 334.

In various embodiments, different structures, may perform the role of a state machine, monitoring application state as it relates to user activity, inputs and so forth with respect to the display interfaces. In some embodiments, this also relates to re-displaying searches, and updating search information from one landing page to another. In some embodiments, the publishing system 304 may include the publishing platform 105A as referenced in FIG. 1A above. Because the publishing platform 105A presents landing page content to the user, the publishing platform 105A may monitor user behavior on specific landing pages and provide updates to other landing pages from third-party publishers as well as the first display window associated with a publisher.

In some embodiments, the task of maintaining application state may fall to the client system 302, the publishing system 304, or a combination of the two. For example, the publishing system 304 may include the publishing platform 105B as referenced in FIG. 1B above. While third-party publishers 107B display respective landing pages to user 126B, the interface 101B receives communication, from the publishing platform 105B, that may include instructions to open a display interface for landing page content. The publishing platform 105B decides which third-party publishers to request content from 118B, and then establishes communication with the interface 101B, which may include sending landing page URLs to use when the interface 101B directly requests landing page content from third-party publishers 120B.

In yet other embodiments, the publishing system 304 may include the publishing platform 105C and content delivery platform 109C as referenced in FIG. 1C, above. Here, the content delivery platform 109C may play as similar role to the publishing platform 105B as referenced in FIG. 1B, above, and the content delivery platform 109C may monitor application state, the client system 302 may monitor application state, or the two structure may share various aspects of this task.

As will be described in greater detail below, the web engine 320 processes content requests 314 and searches the web publishing database 330 for the requested content and presents it to the publisher, which presents the requested content to the client system 302 for display in the interface 310. The web engine 320 also translates the content request 314 and passes the request to the content management engine 322, which searches the content management database 332 to determine what information to present to the user through the interface 310 and what types of landing page content to request, if any, from a third-party publisher 306. According to one embodiment, the content management engine 322 may incorporate or respond to content management or advertising serving (adserving) code resident on the web page or the web site as referenced in the web engine 320. Possible methods for incorporating adserving code include tag managers, ad servers, or other content management systems. According to one embodiment, the web engine 320 may observe various user behaviors, as a user interacts with the publisher's site and may pass that information to the content management engine 322, which the content management engine 322 may then store in the content management database 332.

According to one embodiment, the content management engine 322 and content management database 332 may incorporate observed user behaviors, user preferences, prior user content requests, as well as targeting and retargeting capabilities. In one example, a user may specify which third-party publishers he or she prefers to visit. In another example, the content management database 332 may contain information about users and their activities, including content requests, and the content management engine 322 may pass a saved content request to the web engine 320 so that a returning user may see an interface 310 displaying the results of an earlier content request. According to one embodiment, the content management engine 322 may connect to a retargeting platform or an advertising network.

The content management engine 322 translates requests and passes them to the decision engine 324, which determines from which third-party publishers 306 to request landing page content 316. At the publisher's option, the decision engine 324 is also capable of dynamically suppressing landing page content for any particular page view, such as when a user is forecasted as highly likely to purchase on the current site. In one embodiment, when the user is determined likely to purchase an item, the system is adapted to suppress competing landing page content from any third-party publisher.

The decision engine 324 operates in conjunction with the decision engine database 334 to employ predictive models to compute the expected transaction value associated with a current page view, factoring a number of runtime attributes, including a calculation of user intent, landing page bids, other preferences shared by third-party publishers 306, and other factors. The decision engine 324 may include one or more of the following sub-systems: a proprietary adserver (or equivalent) built by the publisher; a 3rd party adserver (or equivalent) that a publisher is licensing for their own use; an adserver (or equivalent) offered by an advertising network or advertising platform; or an adserver (or equivalent) offered by an ad exchange; or some other equivalent component. Ultimately, the decision engine 324 is responsible for making sure third-party publishers 306 are matched to landing page content requests 314 and 316 according to all the constraints of the publishing system 304, making sure that users receive optimal landing page content, based on system optimization functions. The decision engine 324 may also use an auction, or another algorithm, to determine which landing page content to request.

The decision database 334 may include information about third-party publishers, landing page inventory, potential bids for landing page displays, and so forth. The decision engine 324 may incorporate this information, among other things, in determining from which third-party publisher 306 to request 316 landing page content 318. The request may take the form of a custom URL that passes content request data to a third-party publisher 306.

The publishing system 304 receives landing page content 318 from a third-party publisher 306 and assembles, within the landing page presentation engine 326, landing page content for presentation to the publisher. The publisher then passes the formatted landing page content to the client system 302 for presentation in the navigator interface 312. The landing page presentation engine 326 may include various web servers, content delivery servers, advertising servers, and so forth, and various parties may control various aspects of the landing page presentation engine 326. In some embodiments, such as those illustrated in FIG. 1A, above, the landing page presentation engine 326 may be within the control of a publisher. In other embodiments, such as those illustrated in FIGS. 1B and 1C, above, the landing page presentation engine 326 may include a web server operated by a third-party publisher, with each landing page presented to the client system 302 and rendered as a web page within the presentation interface such as a web browser.

Exemplary Method

Figure 4:
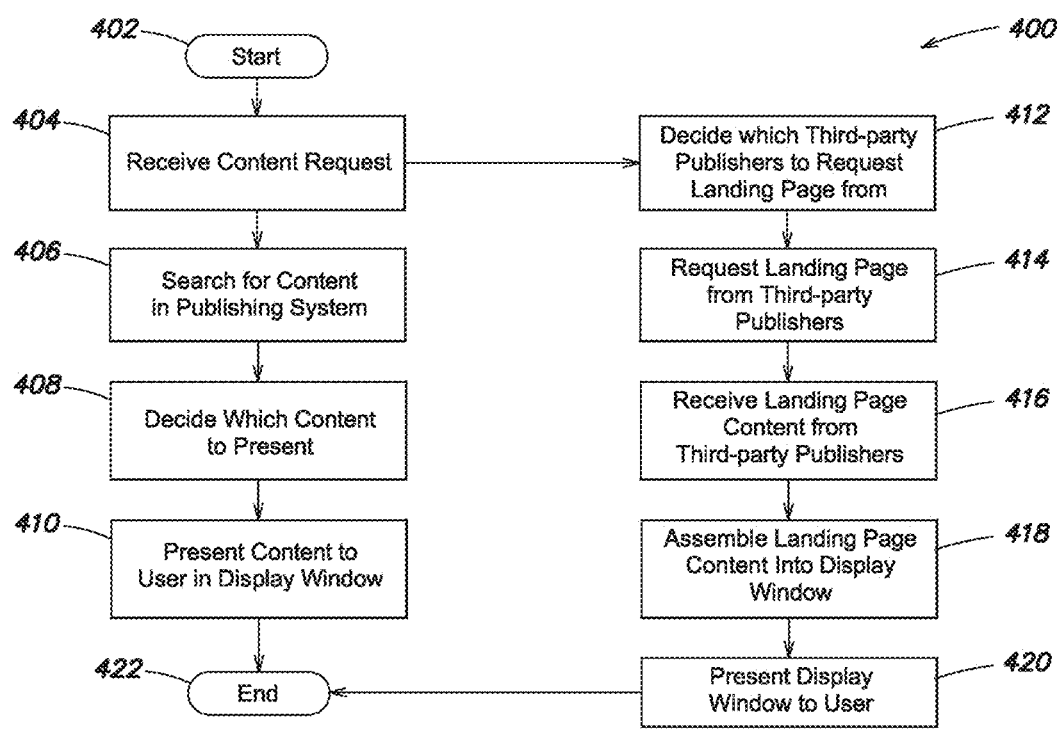
FIG. 4 illustrates an exemplary process for delivering landing page content in accordance with one embodiment of the present disclosure.

FIG. 4 shows one embodiment of a process for delivering landing pages 400. Process 400 may be, for instance, one implementation of system 300 as discussed above with reference to FIG. 3. Process 400 begins at start block 402. At block 404 the publisher of a travel website receives a content request. According to one embodiment, the content request may come from a user interacting with a browser 310 on a client system 302 as referenced in FIG. 3, above. According to another embodiment, the content request may come from a content management engine 322, also referenced in FIG. 3 above, responding to a set of rules defined by a publisher. For example, a publisher may determine a set of behaviors suggesting an intent to purchase a hotel room—the publisher may implement a rule at that decision point to request content related to rental cars and to display that content along with the hotel reservation information. For instance, the content may be displayed in a separate window, below the content, or in any other window and/or orientation with the display. Block 404 initiates two steps indicated by block 406 and block 412.

At block 406, the publishing system accepts the content request and searches for content on, for example, the web engine 320 and web publishing database 330 as referenced in FIG. 3, above. At block 408, the publishing system determines which, of the requested and retrieved content, to present to the user. The decision at block 408 may incorporate intelligence, such as behavioral and contextual inputs, targeting, retargeting, and network information available from the content management engine 322 as referenced in FIG. 3 above. At block 410, the publishing system presents content to a user in a display, such as a web page as shown in browser 310 on a client system 302 as referenced in FIG. 3 above.

At block 412, as initiated by block 406, the publishing system determines whether to request landing page content from one or more of a number of third-party publishers. According to one embodiment, the third-party publishers may be travel websites on which a user may be comparison shopping for an airline ticket. The step at block 412 may be performed by decision engine 324 as referenced in FIG. 3 above. Once the publishing system has determined from which third-party publishers to request landing page content, at block 414, that request is passed to each of the respective third-party publishers, either: (a) directly, by contacting each third-party publisher, (b) indirectly, by contacting an intermediary network, such as an advertising network; or (c) directly by processing HTTP requests from a client, such as a client system 302 or a browser 310 as referenced in FIG. 3 above.

At block 416, the publishing system receives landing page content from third-party publishers. At block 418, the publishing system assembles landing page content for presentation in a display area, such as navigator interface 312 as referenced in FIG. 3 above. At block 420, the publishing system passes the landing page content to the publisher, which presents the landing page content, such as that contained within navigator interface 312, to the user. The steps at 416, 418, and 420 may each be performed by a structure such as landing page presentation engine 326 as referenced in FIG. 3 above.

At block 422, process 400 ends.

It is worth noting that, as discussed with reference to FIGS. 1A-C and FIG. 3, above, other structures, including client software, web browsers and the like may also perform steps of process 400 as described in FIG. 4.

Presentation of Landing Pages

The inventors have recognized that the presentation of landing page content is important in comparison shopping, because only 3-5% of users buy in a given session, and even minor improvements in shopper conversion can lead to tremendous benefits for publishers. In comparison to conventional approaches (e.g. browser windows and tabs), the inventors have recognized an opportunity to make it easier for users to view and navigate multiple landing pages at once.

According to one embodiment, landing page content from one or more third-party publishers may be rendered in a browser window, such as the browser window from which a user makes a content request. According to another embodiment, landing page content may be rendered as an overlay or a lightbox display. According to one embodiment, landing page content may be displayed in a second display area, and in embodiments, the display area may be presented in front of or behind the first display area (e.g. the window from which the user made the original content request). In another embodiment, landing page content may be displayed in a new browser tab or window. In yet another embodiment, when user focus is on a publisher web page, landing page content may be displayed separately in focus or out of focus with respect to a user, and the landing page presentation interface may receive user input (e.g. selection with a cursor, keyboard input, or text entry). In a further embodiment, when user focus is on a landing page provided by a third-party content provider, landing page content from other third-party content providers may be displayed as a representation of a landing page within the presentation interface. In one embodiment, landing page content may be displayed as one or more fully-loaded landing pages.

According to one embodiment, a user may specify how third-party landing page content displays. According to another embodiment, a user may specify from which third-party publishers a publisher should request landing page content. According to another embodiment, various third-party publishers may specify how (e.g. in a popover or popunder browser window) landing page content is displayed.

According to one embodiment, a user may interact with a landing page in a display, and as a result of that interaction, the landing page may subsequently display in a dedicated display area, such as a browser tab or a dedicated browser window (e.g., a popout window).

Additional embodiments addressing the presentation and display of landing page content are discussed below.

Figure 5A:
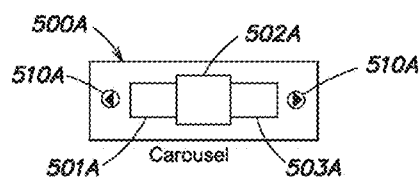
FIG. 5A illustrates an exemplary interface for displaying landing page content in accordance with one embodiment of the present disclosure.
Figure 5B:
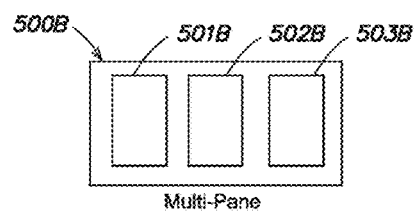
FIG. 5B illustrates an exemplary interface for displaying landing page content in accordance with one embodiment of the present disclosure.
Figure 5C:
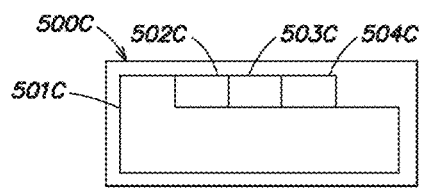
FIG. 5C illustrates an exemplary interface for displaying landing page content in accordance with one embodiment of the present disclosure.

FIGS. 5A-5E show various embodiments of landing pages arrayed in a display area. FIGS. 5A, 5B, 5D and 5E show three landing pages, and FIG. 5C shows four landing pages; however any number of landing pages is possible in any of the display areas shown in FIGS. SA-5E. According to one embodiment, a user makes a first content request in a first display window (e.g. a web browser) associated with a publisher (e.g. a publisher of a web site). Upon receiving this content request, the publisher decides, as discussed in the exemplary method as referenced in FIG. 4, above, whether to display landing page content from third-party publishers. The publisher, the publishing platform, an intermediary network (e.g. a content delivery network or an advertising network), or a user then selects the third-party publishers from which to request landing page content. Upon receipt of landing page content, the publisher, or an intermediary such as a network (e.g. a content delivery network, an advertising network) arranges the landing pages for presentation in a variety of array formats. Landing page content may be displayed in the first display area or a second display area as described above. Notably, the landing page content is derived from multiple third-party publishers is presented within a navigation area that makes it easier for users to view alternate content that is updated in real-time.

FIG. 5A depicts an embodiment of a display area 500A with landing pages arrayed in a carousel format in which a user may rotate through the available landing pages 501A, 502A, and 503A by gesturing with a mouse, finger, or other element. In comparison to conventional approaches, which often limit display to a single browser or tab, the carousel display offers the benefit of allowing a user to see multiple landing pages while focusing on a specific one. The user may also rotate through the landing pages by selecting an arrow button 510A at either side of the display. As shown in FIG. 5A, landing page 502A is displayed in the center of the carousel and is the current focus of the user's attention.

FIG. 5B depicts an embodiment of a display area 500B with landing pages arrayed in a tiled or multi-pane format in which a user sees one or more landing pages 501B, 502B, and 503B in a set of vertical or horizontal panes inside the browser window. In comparison to conventional approaches, which often limit display to a single browser or tab, the tiled or multi-pane display offers the benefit of allowing a user to see multiple landing pages while focusing on a specific one. Upon selecting a landing page, the selected landing page may be enlarged, presented in front of the other landing pages, popped out, or otherwise displayed to the user.

FIG. 5C depicts an embodiment of a display area 500C with landing pages arrayed in a horizontal tab format in which a user may select a tab (e.g. by clicking on the tab) to view the available landing pages 501C, 502C, and 503C. In comparison to conventional approaches, which limit the available display options for information within a given tab, the tab format offers publishers the ability to display images as well as text in the displayed tab of an unfocused window. Upon selecting a landing page, the selected landing page may be presented in front of the other landing pages. As shown in FIG. 5C, landing page 501C is displayed on top of the tab display and is the current focus of the user's attention. One or more of the landing pages 502C, 503C, or 504C as represented by the tabs may be preloaded when the display area is first instantiated or may optionally be loaded only once the user selects the corresponding tab.

Figure 5D:
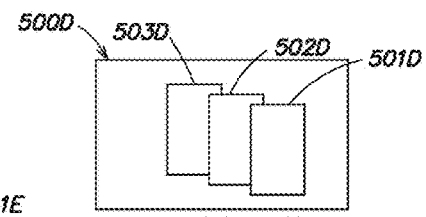
FIG. 5D illustrates an exemplary interface for displaying landing page content in accordance with one embodiment of the present disclosure.

FIG. 5D depicts an embodiment of a display area 500D with landing pages arrayed in a stacked or staggered format in which a user sees the landing pages staggered or stacked on top of each other. The user may select (e.g. by clicking on) one of the available landing pages 501D, 502D, and 503D. In comparison to conventional approaches, which often limit display to a single browser or tab, the stacked or staggered display offers the benefit of allowing a user to see multiple landing pages while focusing on a specific one. Upon selecting a landing page, the selected landing page may be presented in front of the other landing pages. As shown in FIG. 5D, landing page 501D is displayed on top of the stack or staggered display and is the current focus of the user's attention.

Figure 5E:
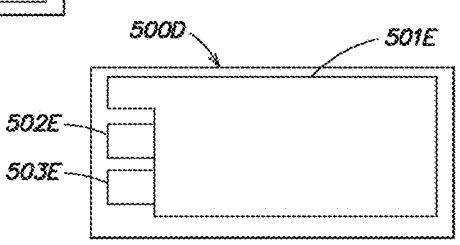
FIG. 5E illustrates an exemplary interface for displaying landing page content in accordance with one embodiment of the present disclosure.

FIG. 5E depicts an embodiment of a display area 500E with landing pages arrayed in a vertical tab format in which a user may select a tab (e.g. by clicking on the tab) to view the available landing pages 501E, 502E, and 503E. In comparison to conventional approaches, which limit the available display options for information within a given tab, the tab format offers publishers the ability to display images as well as text in the displayed tab of an unfocused window. Upon selecting a landing page, the selected landing page may be presented in front of the other landing pages. As shown in FIG. 5E, landing page 501E is displayed on top of the tab display and is the current focus of the user's attention. As with FIG. 5C, the landing page for each tab may be pre-loaded upon display instantiation, or loading may be deferred until user selects any such tab. In one embodiment, the multiple sets of landing page content, may be updated in real time, and may be responsive to additional user input, changes in parameters, historical data and/or other third party data sources, or other criteria.

According to one embodiment, the display area may incorporate visual cues to indicate to the user that the system is loading landing page content. According to one embodiment, a user may select a control within the interface to enlarge a specific display area. In another embodiment, a user may see a swipe prompt at the top of a display area, with the swipe prompt encouraging the user to view additional landing pages by swiping an interactive gesture across the display interface.

According to one embodiment, the display area incorporating multiple landing pages may include multiple distinct display areas, arranged so as to give the perception to the end user of a fully-integrated landing page navigation display. For example, in certain web browsers, such as Apple's Safari browser, iFrame security rules embedded within the browser prevent a publisher from displaying landing page content in the methods described above. In one embodiment, a publishing platform 105A as referenced in FIG. 1A, above, may render a display area so that it appears that each landing page is displayed in the same window (including positioning and sizing all relevant windows correctly) even though the publishing platform 105A actually renders the landing page content as separate windows.

Figure 6A:
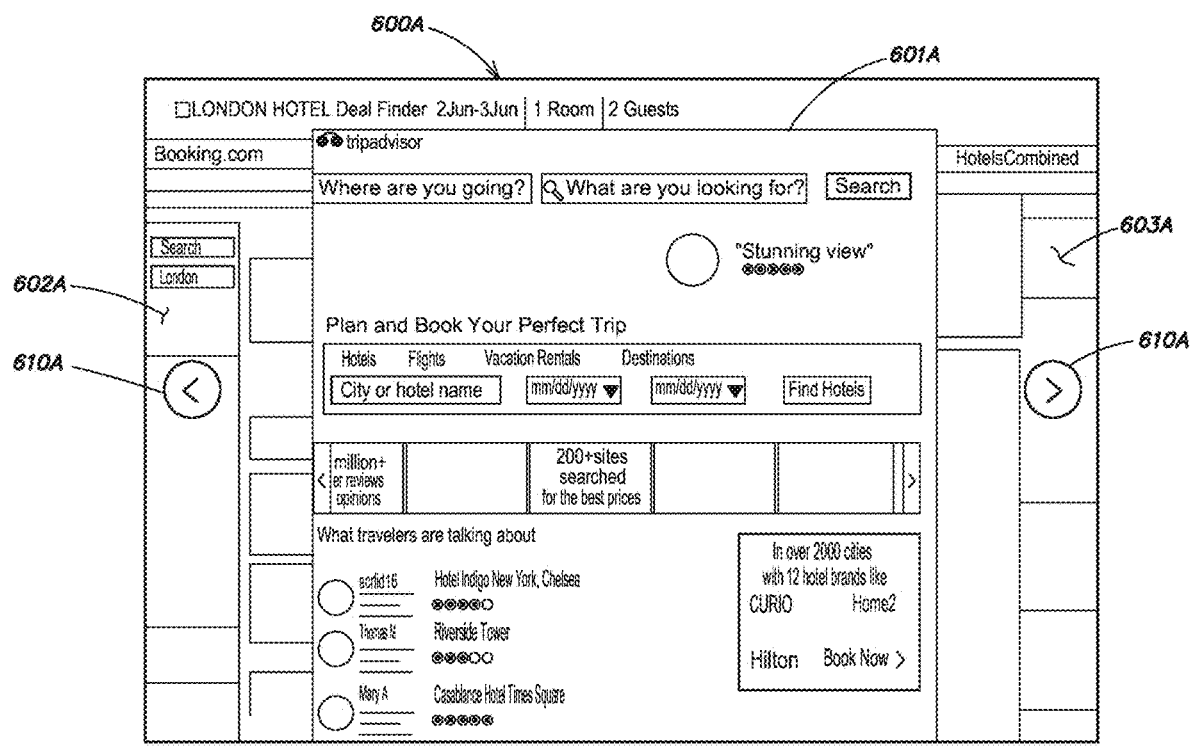
FIG. 6A illustrates an exemplary interface for depicting landing page content in accordance with one embodiment of the present disclosure.
Figure 6B:
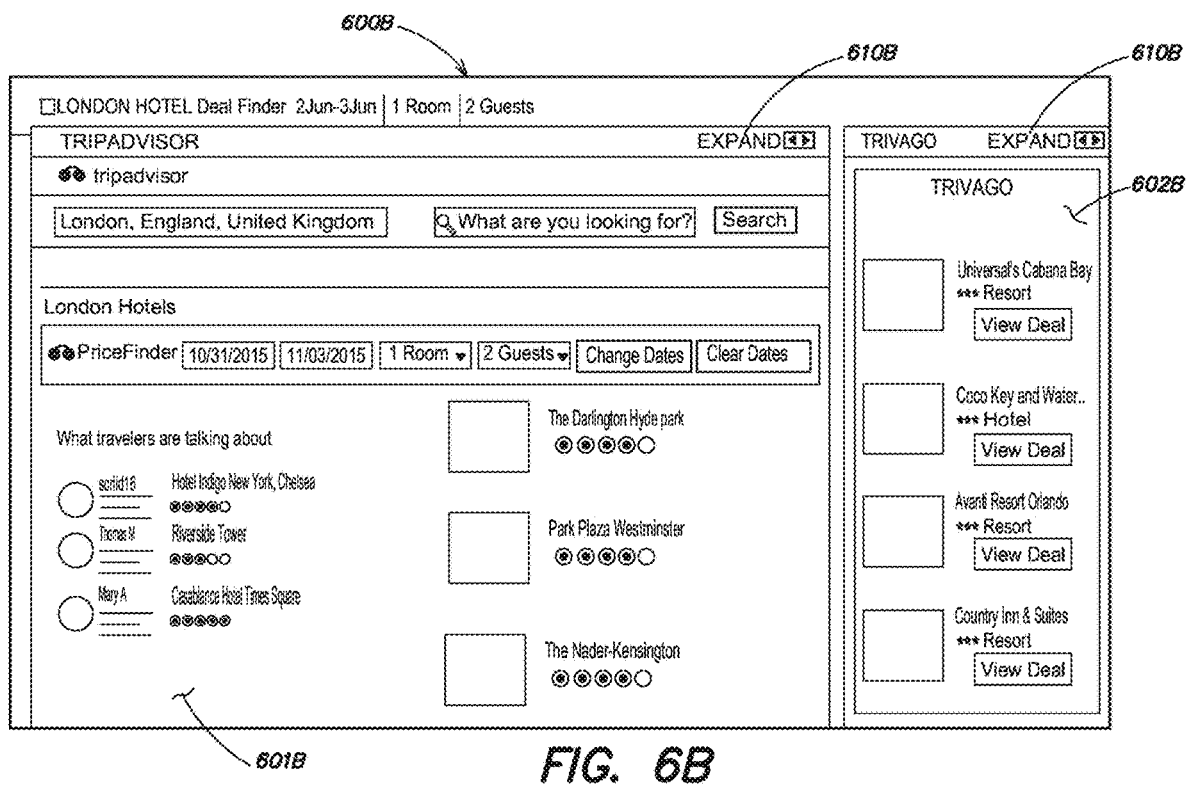
FIG. 6B illustrates an exemplary interface for depicting landing page content in accordance with one embodiment of the present disclosure.
Figure 6C:
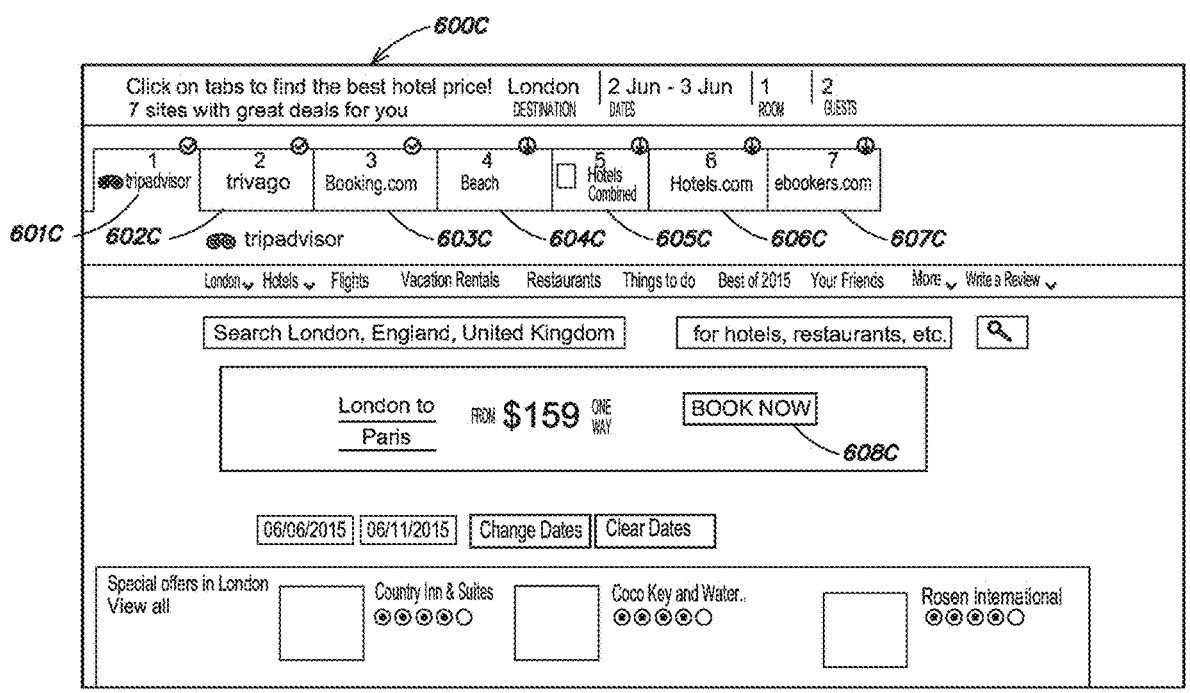
FIG. 6C illustrates an exemplary interface for depicting landing page content in accordance with one embodiment of the present disclosure.

FIGS. 6A-6C shows various embodiments of landing page depictions in a display area. FIG. 6A shows an embodiment of a pre-loaded landing page in a carousel array within display area 600A. The center pre-loaded landing page 601A is in focus and is presented to the user. The other two landing pages 602A and 603A are also pre-loaded with the landing page content and are displayed behind the center pre-loaded landing page 601A and may be darkened or displayed in a manner so as to convey that these pages are not the focus page. Control buttons 610A are visible in front of landing pages 602A and 603A.

FIG. 6B shows an embodiment of a pre-loaded landing page in a tile or multi-pane array with a display area 600B. The primary pre-loaded landing page 601B is the focus of the user's attention and is displayed in a larger tile or pane. The secondary landing page 602B is also pre-loaded with landing page content but is displayed in a smaller tile or pane. A user may direct his or her attention to the secondary landing page 602B by selecting the "expand" button 610B within the display. Alternatively, a user may further select landing page 601B by selecting the "expand" button 610B, which may cause the landing page 601B to pop out or to display in a separate window.

FIG. 6C shows an embodiment of a pre-loaded landing page in a horizontal tab array within a display area 600C. The primary pre-loaded landing page 601C contains a landing page comprising a search window displaying a banner advertisement 608C. Other tabs 602C, 603C, 604C, 605C, 606C, and 607C contain logos representing additional third-party publisher landing pages. These third-party publisher landing pages may already be loaded by the publishing platform 105A as referenced in FIG. 1A (e.g., they may be preloaded), above, or the landing pages may load when a user clicks on the tab.

According to one embodiment, landing page content may be displayed as an image in various forms including, but not limited to: an icon or logo representing a third-party publisher, an icon or logo representing the publisher of the initial page from which the content request was made, a "wait screen" indicating that the landing page has not yet loaded, and so on and so forth.

Figure 7:
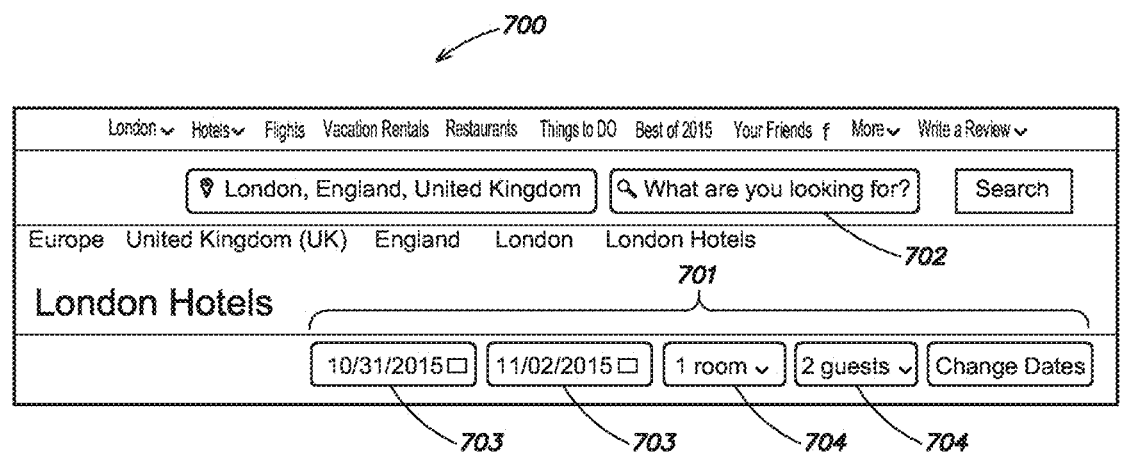
FIG. 7 illustrates an exemplary interface for displaying an initial control in accordance with one embodiment of the present disclosure.

FIG. 7 shows an embodiment of an initial control 701 within a display area 700. Controls may include a text box 702 for text entry, a date selector 703, and a drop-down list 704. Additional controls are possible, including sliders, buttons, numeric value inputs, check boxes, user-selectable tags, and so forth. In one embodiment, an initial control may be found in first display area, such as a web page. In another embodiment, an initial control may be found in a landing page which may, or may not, be in the first display area. In some embodiments, landing pages may be presented in a second display area, and initial controls may be presented within the landing pages.

While not shown in FIG. 7, in one embodiment, the initial control 701 may include a series of checkboxes for identifying third-party publishers from which to request landing page content. In another embodiment, the initial control 701 may include a series of boxes, tabs or other graphical elements that may also include third-party publisher logos to allow a user to select a third-party content provider site to highlight in the display area 700. In yet another embodiment, the initial control 701 may appear in a display area 700 presented in popover format in front of open windows and display areas.

Content Requests

Content requests, such as content request 112A as referenced in FIG. 1A above, may originate in a variety of manners. As discussed above, according to one embodiment, a user may request content from a publisher. According to other embodiments, a content request may originate within a publishing platform 105A as referenced in FIG. 1A above.

According to one embodiment, a request for content, such as the request for content received in block 404 as referenced in FIG. 4 above, may initiate a number of steps to display publisher content and/or landing pages from third-party publishers.

According to another embodiment, a publisher may store or save a request for content. This request for content may be associated with a user as identified in any number of ways, including: browser cookie, browser pixel, media access control (MAC) sublayer address, device identifier, user ID, mobile device identifier, login information, and so forth. In subsequent user sessions, a publisher, or a third-party publisher, may desire to display content or landing page content responsive to that content request. For example, a publisher may wish to display airline ticket information for flights to Los Angeles, Calif. to a user who searched for hotels in Los Angeles, Calif. in a prior session. Alternatively, a publisher may wish to display the same hotel search to the user if the prior session terminated recently. Similarly, these options may extend to landing pages presented by third-party publishers, and a publisher may present pre-loaded landing pages responsive to saved searches from prior sessions.

Content Refresh

According to one embodiment, a publisher may observe user activity within a distributed computing system and may configure a structure, such as a publishing system 304 as referenced in FIG. 3 above, or a publishing platform 105A as referenced in FIG. 1A above, to refresh content automatically in order to ensure that publisher and third-party landing page content is accurate and up to date. The publisher may select one of any number of events to trigger a content request (and ultimately an update of publisher and/or third-party landing page content), including but not limited to: time (e.g. automatically refreshing after an elapsed period of time); user actions (e.g. demonstrating an intent to purchase or closing or minimizing a display area); a request from a third-party publisher to refresh a landing page; and so forth.

Search Update

According to one embodiment, once a display area has been populated with content responsive to a content request, a user, publisher, or third-party publisher, may make a second content request. This second content request may form the basis for an update of the publisher content and/or the third-party landing page content. For example, after requesting new content (e.g. searching) on the initial publisher display area (e.g. browser window), a user may be prompted (e.g. with an interactive interface in the display area incorporating the text "Compare All Prices") to update the search within the third-party landing pages.

Figure 8:
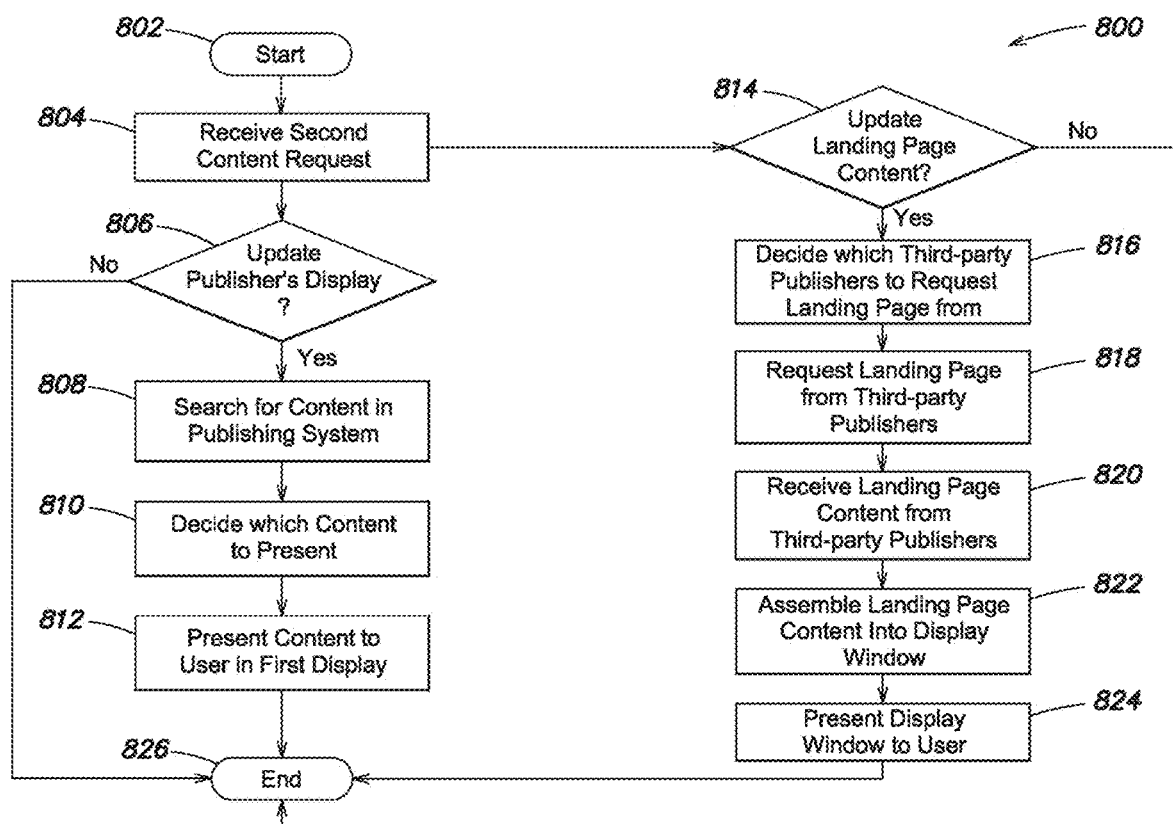
FIG. 8 illustrates an exemplary process for delivering landing page content in accordance with one embodiment of the present disclosure.

FIG. 8 shows one embodiment of a process for updating a search and delivering landing pages 800. Process 800 may, for instance, be one implementation of system 300 as discussed above with reference to FIG. 3. Process 800 begins at start block 802. At block 804 the publisher of a travel website receives a second content request. According to one embodiment, the content request may come from a user interacting with a browser 310 on a client system 302 as referenced in FIG. 3, above. According to another embodiment, the content request may come from a content management engine 322, also referenced in FIG. 3 above, responding to a set of rules defined by a publisher. For example, a publisher may determine a set of behaviors suggesting an intent to purchase a hotel room—the publisher may implement a rule at that decision point to request content related to rental cars and to display that content alongside the hotel reservation information. Block 804 initiates two steps indicated by block 806 and block 814.

At block 806 the publishing system decides whether or not to update the publisher's display area associated with the second content request. If not, the process terminates at block 826. If the publishing system decides to update the publisher's display area, the process proceeds to block 808.

At block 808, the publishing system accepts the content request and searches for content on, for example, the web engine 320 and web publishing database 330 as referenced in FIG. 3, above. At block 810, the publishing system determines which, of the requested and retrieved content, to present to the user. The decision at block 810 may incorporate intelligence, such as behavioral and contextual inputs, targeting, retargeting, and network information available from the content management engine 322 as referenced in FIG. 3 above. At block 812, the publishing system presents content to a user in a display, such as a web page as shown in browser 310 on a client system 302 as referenced in FIG. 3 above.

At block 814 the publishing system decides whether or not to update the landing page content area associated with the second content request. If not, the process terminates at block 826. If the publishing system decided to update the publisher's display area, the process proceeds to block 816.

At block 816, the publishing system decides from which third-party publishers to request landing page content. According to one embodiment, the third-party publishers may be travel websites on which a user may be comparison shopping for an airline ticket. The step at block 816 may be performed by decision engine 324 as referenced in FIG. 3 above. Once the publishing system has determined from which third-party publishers to request landing page content, at block 818, that request is passed to each of the respective third-party publishers, either directly, by contacting each third-party publisher, or indirectly, by contacting an intermediary network, such as an advertising network.

At block 820, the publishing system receives landing page content from third-party publishers. At block 822, the publishing system assembles landing page content for presentation in a display area, such as navigator interface 312 as referenced in FIG. 3 above. At block 824, the publishing system passes the landing page content to the publisher, which presents the landing page content, such as that contained within navigator interface 312, to the user. The steps at 820, 822, and 824 may each be performed by a structure such as landing page presentation engine 326 as referenced in FIG. 3 above.

At block 826, process 800 ends.

It is worth noting that, as discussed with reference to FIGS. 1A-C, FIG. 3 and FIG. 4, above, other structures, including client software, web browsers and the like may also perform steps of process 800 as described in FIG. 8.

According to one embodiment, a user may make a first content request by searching on fly.com for flights from NYC to SFO. The publishing system displays landing page content in a popunder window displayed behind the fly.com display area, and loads content for NYC-SFO for selected third-party publishers. The user then changes the search on fly.com from SFO to LAX, and the publishing platform automatically refreshes third-party landing page content to reflect LAX as the destination airport. According to one embodiment, this search may propagate from the fly.com display area to the third-party landing pages through a number of methods including: direct message from fly.com, a mutually-readable local or server-side cookie, or another storage and communication technique.

According to one embodiment, a user may make a first content request by searching on fly.com for flights from NYC to SFO. The publishing system displays landing page content in a popunder window displayed behind the fly.com display area, and loads content for NYC-SFO for selected third-party publishers. The user may then, in a third display area, visit Orbitz.com (which belongs to the same content delivery or advertising network as fly.com) and may make a second content request by performing a search for NYC to SEA there. Because the two publishers share an intermediary network, fly.com may update the search on the fly.com display area and/or update the search in the third-party landing page content displayed as a popunder window in a second display area.

Exemplary General Purpose Computer System

Various embodiments according to the present invention may be implemented on one or more computer systems. These computer systems may be, for example, general-purpose computers such as those based on the Intel Core® processor, Apple "A" Series processors, AMD Athlon and A-Series processors, Qualcommm Snapdragon, processors, or any other type of processor. It should be appreciated that one or more of any type computer system may be used to determine ad placement according to various embodiments of the invention. Further, the system may be located on a single computer or may be distributed among a plurality of computers attached by a communications network.

A general-purpose computer system according to one embodiment of the invention is configured to perform any of the described functions, including but not limited to, observing user interactions within a distributed computer system, displaying a graphical user interface to the user of a distributed computer system, presenting web pages to visitors of a publisher or third-party publisher website, receiving content requests, receiving controls from user interactions with a graphical user interface, searching for content, deciding whether to request landing page content, selecting third-parties from which to request landing page content, receiving landing page content, assembling landing page content, and presenting landing page content to an interface. It should be appreciated that the system may perform other functions, including, but not limited to, storing and/or managing the historical behavior of users, monitoring the conversion of return users, maintaining a database of third-party publishers, maintaining a database of landing page inventors, maintaining a database of landing page bid requests, etc., and it should also be appreciated that the invention is not limited to having any particular function or set of functions.

Figure 9:
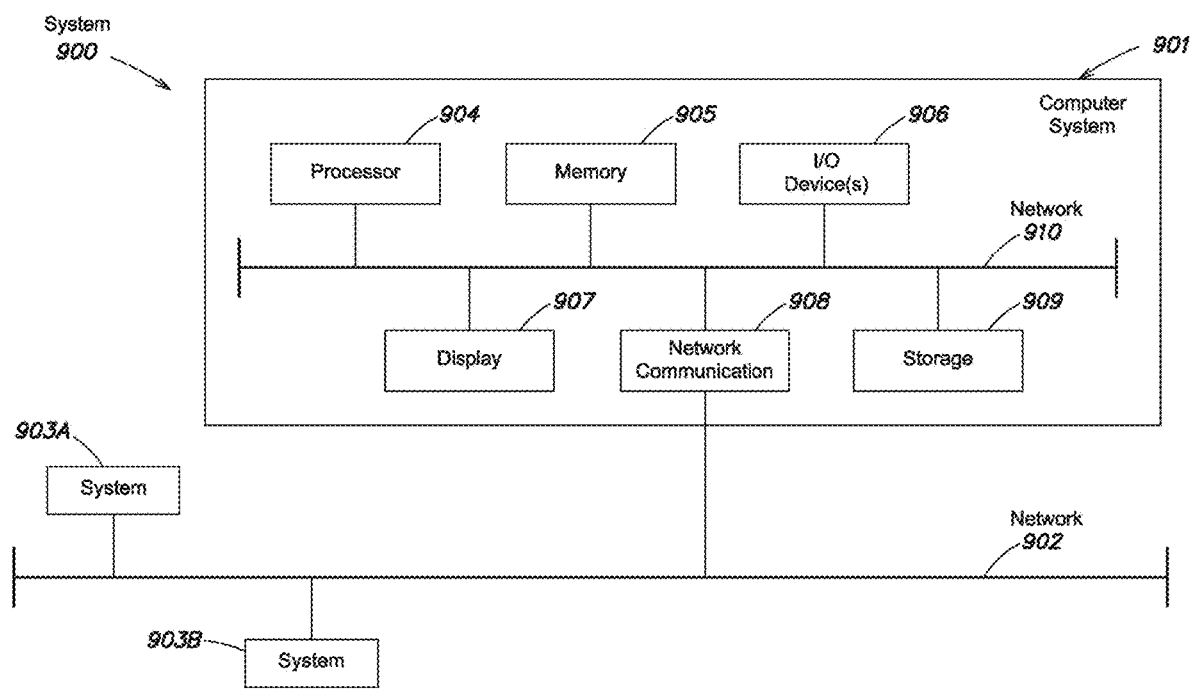
FIG. 9 is an exemplary system diagram in accordance with one embodiment of the present disclosure.

FIG. 9 shows a block diagram of a general purpose computer and network system 900 in which various aspects of the present invention may be practiced. For example, various aspects of the invention may be implemented as specialized software executing in one or more computer systems including general-purpose computer system 901 shown in FIG. 9. Computer system 901 may include a processor 904 connected to one or more memory devices 905, such as a disk drive, memory, or other device for storing data. Memory 905 is typically used for storing programs and data during operation of the computer system 901. Components of computer system 901 may be coupled by an interconnection mechanism such as network 910, which may include one or more busses (e.g., between components that are integrated within a same machine) and/or a network (e.g., between components that reside on separate discrete machines). The interconnection mechanism enables communications (e.g., data, instructions) to be exchanged between system components of system 901.

Computer system 901 also includes one or more input/output (I/O) devices 906, for example, a keyboard, mouse, trackball, microphone, touch screen, a printing device, display screen, speaker, etc. In addition, computer system 901 may contain one or more interfaces (e.g., network communication device 908) that connect computer system 901 to a communication network (in addition or as an alternative to the network 910).

Storage system 909 typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 909, as shown, or in memory system 905. The processor 904 generally manipulates the data within the integrated circuit memory 904, and then copies the data to the medium associated with storage 909 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 901 is shown by way of example as one type of computer system upon which various aspects of the invention may be practiced, it should be appreciated that aspects of the invention are not limited to being implemented on the computer system as shown in FIG. 9. Various aspects of the invention may be practiced on one or more computers having a different architectures or components than that shown in FIG. 9.

Computer system 901 may be a general-purpose computer system that is programmable using a high-level computer programming language. Computer system 901 may be also implemented using specially programmed, special purpose hardware. In computer system 901, processor 904 is typically a commercially-available processor such as the well-known Core® series processor available from the Intel Corporation, although many other processors are available. Such a processor usually executes an operating system which may be, for example, the Android mobile operating system available from Google, Inc., the iOS mobile operating system available from Apple Computer, various Windows-based operating systems available from the Microsoft Corporation, the MAC OS operating system available from Apple Computer, or one or more of the Linux-based and UNIX-based operating system distributions (e.g., the Enterprise Linux operating system available from Red Hat Inc.) available from various sources. It should be understood that the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. By way of further example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 900. For instance, the system may be a distributed system (e.g., client server, multi-tier system). In one example, the system includes software processes executing on a system associated with a user (e.g., a client system). These systems may permit the user to determine a user's context and/or intent as expressed within an ecommerce site, and to provide advertisements from other ecommerce sites, and to display them to the user.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A distributed computer system comprising:
at least one processor; and
at least one storage medium having encoded thereon instructions that, when executed by the at least one processor, cause the at least one processor to:
accept a first content request in response to a first action performed by a user interacting with at least one graphical user interface provided by the computer system, the first content request comprising one or more parameters for executing a search;
transmit the first content request comprising the one or more parameters for executing the search to a publishing platform;
receive landing page content responsive to transmitting the first content request to the publishing platform without navigating away from the at least one first graphical user interface, the landing page content comprising results of executing a first search by at least one publisher separate from the computer system using the one or more parameters;
generate, as a portion of the at least one graphical user interface, a presentation interface comprising a display of a representation of the received landing page content, the generating comprising:
rendering, within the presentation interface, a fully loaded landing page displaying a representation of at least some of the results of executing the first search by the at least one publisher;
detect a change in the one or more parameters for executing the search; and
update content in the fully loaded landing page rendered within the presentation interface responsive to detecting the change in the one or more parameters for executing the search, the updating comprising:
obtaining updated landing page content, the updated landing page content comprising results of executing a second search by the at least one publisher using the changed one or more parameters; and
rendering, within the presentation interface, an updated fully loaded landing page displaying a representation of at least some results of executing the second search by the at least one publisher.

2. The system of claim 1 wherein the representation of the received landing page content is arranged in one or more of the formats comprising the group of: landing page thumbnail, loaded landing page, icon representing the landing page content, or image representing the landing page content.

3. The system of claim 1 wherein the at least one graphical user interface comprises a control area, and wherein the first action performed by the user comprises interacting with the control area.

4. The system of claim 1, wherein the presentation interface comprises a first and second content display area, and wherein the instructions further cause the at least one processor to:
display landing page content generated by a first one of the at least one publisher in the first content display area; and
display landing page content generated by a second one of the at least one publisher in the second content display area.

5. The system of claim 1, wherein the instructions further cause the at least one processor to:
- in response to a second action performed by the user interacting with the at least one graphical user interface, accept a second content request;
- transmit the second content request to the publishing platform;
- receive landing page content responsive to transmitting the second content request without navigating away from the at least one graphical user interface; and
- display, within the presentation interface, a representation of the landing page content received responsive to transmitting the second request.

6. The system of claim 1, wherein the instructions further cause that at least one processor to observe user interactions with the at least one graphical user interface.

7. The system of claim 1, wherein the at least one publisher comprises a plurality of publishers, wherein generating the presentation interface comprises:
- rendering first landing page content from a first one of the plurality of publishers in a first component of the presentation interface, the rendered first landing page content comprising the fully loaded landing page; and
- preloading landing page content received from a second one of the plurality of publishers, wherein shifting the presentation interface to a second component of the presentation interface causes rendering of the preloaded landing page content received from the second publisher in the second component of the presentation interface as a second fully loaded landing page.

8. The system of claim 1, wherein the at least one publisher comprises a plurality of publishers, and generating the presentation interface comprises generating a carousel user interface configured to rotate through representations of landing page content generated by at least some of the plurality of publishers.

9. The system of claim 1, wherein the at least one publisher comprises a plurality of publishers, and generating the presentation interface comprises generating an array of panes, each of the panes displaying a representation of landing page content generated by each of at least some of the plurality of publishers.

10. The system of claim 9, wherein generating the presentation interface comprises displaying the array of panes in a stack in the presentation interface, wherein the instructions further cause the at least one processor to:
- in response to selection of one of the panes, focus the selected pane by placing the selected pane in front of the stack.

11. The system of claim 1, wherein the at least one publisher comprises a plurality of publishers, and generating the presentation interface comprises generating an array of tabs, each of the tabs associated with one of at least some of the plurality of publishers, wherein the instructions further cause the at least one processor to:
- in response to selection of a respective one of the tabs, display landing page content in the presentation interface generated by a respective one of the at least some publishers associated with the respective tab.

12. The system of claim 1, wherein the at least one graphical user interface comprises a first window and the portion of the at least one graphical user interface comprises a second window separate from the first window.

13. The system of claim 1, wherein the at least one graphical user interface comprises a first web page of a web site provided by the computer system.

14. The system of claim 13, wherein the portion of the at least one graphical user interface comprises a portion of the first web page.

15. The system of claim 13, wherein the portion of the at least one graphical user interface comprises a second web page of the web site separate from the first web page.

16. The system of claim 1, wherein the first action comprises submitting the one or more search parameters for executing the search, and accepting the first content request comprises accepting the one or more search parameters.

17. The system of claim 1, wherein the instructions further cause the at least one processor to display, within the presentation interface, at least one name and/or at least one logo associated with the landing page content.

18. The system of claim 1, wherein the at least one graphical user interface comprises at least one user interface of a mobile application provided by the computer system.

19. A method implemented in a computer system comprising:
- accepting a first content request in response to a first action performed by a user interacting with at least one graphical user interface provided by the computer system, the first content request comprising one or more parameters for executing a search;
- transmitting the first content request comprising the one or more parameters for executing the search to a publishing platform;
- receiving landing page content responsive to transmitting the first content request to the publishing platform without navigating away from the at least one graphical user interface, the landing page content comprising results of executing a first search by at least one publisher separate from the computer system using the one or more parameters;
- generating, as a portion of the at least one graphical user interface, a presentation interface comprising a display of a representation of the received landing page content, the generating comprising:
  - rendering, within the presentation interface, a fully loaded landing page displaying a representation of at least some of the results of executing the first search by the at least one publisher using the one or more parameters;
- detecting a change in the one or more parameters for executing the search; and
- updating content in the fully loaded landing page rendered within the presentation interface responsive to detecting the change in the one or more parameters for executing the search, the updating comprising:
  - obtaining updated landing page content, the updated landing page content comprising results of executing a second search by the at least one publisher using the changed one or more parameters; and
  - rendering, within the presentation interface, an updated fully loaded landing page displaying a representation of at least some results of executing the second search by the at least one publisher.

20. At least one non-transitory computer-readable storage medium storing instructions thereon that, when executed by a computer system, cause the computer system to perform a method comprising:
- accepting a first content request in response to a first action performed by a user interacting with at least one graphical user interface provided by the computer system, the first content request comprising one or more parameters for executing a search;

transmitting the first content request comprising the one or more parameters for executing the search to a publishing platform;

receiving landing page content responsive to transmitting the first content request to the publishing platform without navigating away from the at least one graphical user interface, the landing page content comprising results of executing a first search by at least one publisher separate from the computer system using the one or more parameters;

generating, as a portion of the at least one graphical user interface, a presentation interface comprising a display of a representation of the received landing page content, the generating comprising:
- rendering, within the presentation interface, a fully loaded landing page displaying a representation of at least some of the results of executing the search by the at least one publisher;

detecting a change in the one or more parameters for executing the search; and updating content in the fully loaded landing page rendered within the presentation interface responsive to detecting the change in the one or more parameters for executing the search, the updating comprising:
- obtaining updated landing page content, the updated landing page content comprising results of executing a second search by the at least one publisher using the changed one or more parameters; and
- rendering, within the presentation interface, an updated fully loaded landing page displaying a representation of at least some results of executing the second search by the at least one publisher.

* * * * *